US011777593B2

(12) United States Patent
Eichen

(10) Patent No.: US 11,777,593 B2
(45) Date of Patent: Oct. 3, 2023

(54) DYNAMIC GEOGRAPHICAL SPECTRUM SHARING

(71) Applicant: Elliot Eichen, Arlington, MA (US)

(72) Inventor: Elliot Eichen, Arlington, MA (US)

( * ) Notice: Subject to any disclaimer, the term of this patent is extended or adjusted under 35 U.S.C. 154(b) by 0 days.

(21) Appl. No.: 18/071,081

(22) Filed: Nov. 29, 2022

(65) Prior Publication Data

US 2023/0092144 A1 Mar. 23, 2023

Related U.S. Application Data

(63) Continuation of application No. 17/391,326, filed on Aug. 2, 2021, now Pat. No. 11,522,603, which is a continuation of application No. 16/991,591, filed on Aug. 12, 2020, now Pat. No. 11,095,361.

(60) Provisional application No. 62/938,606, filed on Nov. 21, 2019, provisional application No. 62/891,265, filed on Aug. 23, 2019.

(51) Int. Cl.
*H04B 7/185* (2006.01)
*H04W 16/14* (2009.01)

(52) U.S. Cl.
CPC .............. *H04B 7/18513* (2013.01); *H04W 16/14* (2013.01)

(58) Field of Classification Search
CPC ........... H04B 7/185-195; H04W 16/14
See application file for complete search history.

(56) References Cited

U.S. PATENT DOCUMENTS

| 6,035,710 | A | 3/2000 | Hutchison et al. |
| 7,925,167 | B1 | 4/2011 | Kozubal et al. |
| 10,848,237 | B1 | 11/2020 | Sorond et al. |
| 2001/0045494 | A1 | 11/2001 | Higgins |
| 2008/0287124 | A1 | 11/2008 | Karabinis |
| 2014/0324881 | A1* | 10/2014 | Ransil et al. ........ G06F 16/2255 707/741 |
| 2015/0188644 | A1* | 7/2015 | Kang et al. .......... H04B 7/2041 455/12.1 |

(Continued)

FOREIGN PATENT DOCUMENTS

| WO | 0174081 A1 | 10/2001 |
| WO | 2018148920 A1 | 8/2018 |

OTHER PUBLICATIONS

Apr. 07, 2021 - (US) Notice of Allowance - U.S. Appl. No. 16/991,591.
Aug. 02, 2022- (US) Notice of Allowance - U.S. Appl. No. 17/391,326.

(Continued)

*Primary Examiner* — Raymond S Dean
(74) *Attorney, Agent, or Firm* — Banner & Witcoff, Ltd.

(57) ABSTRACT

Methods, apparatuses, computer-readable mediums for storing software, and systems for dynamic geographical spectrum sharing (DGSS) by Earth exploration satellite services (EESS) are described herein. Using DGSS mechanisms described herein, electromagnetic spectrum may be shared by sensors onboard Earth exploration satellites and wireless networks, such as 5G networks. The DGSS mechanisms may include mechanisms for determining an instantaneous field of view (IFOV) and mechanisms for modifying transmission characteristics while network antennas and power radiated by such antennas are within a window encompassing the IFOV. For example, when the IFOV of a satellite sensor for measuring atmospheric water includes a 5G antenna, the power of the 5G antenna may be reduced, the 5G antenna may be prevented from utilizing a segment of the electromagnetic spectrum, etc. The DGSS mechanisms may also determine actual out of band emissions for a specific pixel associated with the IFOV and improve pixel location determinations.

20 Claims, 15 Drawing Sheets

(56) References Cited

U.S. PATENT DOCUMENTS

| | | | |
|---|---|---|---|
| 2017/0017534 A1* | 1/2017 | De Amici | G06F 11/00 |
| 2018/0205722 A1* | 7/2018 | Getschmann et al. | H04L 63/0876 |
| 2019/0120969 A1* | 4/2019 | Hamzeh et al. | H04J 11/0073 |
| 2019/0245590 A1* | 8/2019 | Singh | H04B 7/043 |
| 2020/0313758 A1* | 10/2020 | Chawla et al. | H04B 7/18519 |
| 2020/0374976 A1 | 11/2020 | Dutta et al. | |
| 2021/0003702 A1 | 1/2021 | Weiner et al. | |

OTHER PUBLICATIONS

Curtis, Harold "Interference between Satellite Communication Systems and Common Carrier Surface Systems" The Bell System Technical Journal, published May 1962, pages 921-943.
Feb. 11, 2021- (EP) Search Report - App No. 20191394.4.
Oct. 19, 2022- (EP) Examination Report - App No. 20191394.4.

* cited by examiner

| Instruement | ATMS | AMSU-A | SSMIS | MWRI |
|---|---|---|---|---|
| Type | cross-track | cross-track | conical | conical |
| Primary Satellite | NOAA-20 | METOP-C | DMSP 5D-3 F18 | FENGYUN 3D |
| NORAD-ID | 43013 | 43689 | 35951 | 43010 |
| current apogee [km] | 834.7 | 828.4 | 863.4 | 833.80 |
| ECT | 13:30 | 21:23 | 07:08 | 14:00 |
| $T_{scan}$ [sec] (full rev reflector) | 2.67 | 8 | 11.90 | 1.70 |
| $SCAN_v$ [velocity, km/sec] | 820.7 | 230.0 | 138.0 | 784.6 |
| Satellite period [min] | 101.4 | 101.3 | 101.90 | 101.4 |
| $SAT_v$ [km/sec] | 6.59 | 6.59 | 6.55 | 6.59 |
| 23.8 GHz chan | Yes | Yes | N (22.2GHz) | Yes |
| Scan Angle [± degrees] | 52.7 | 48.0 | 72.0 | 53.1 |
| pixel (nadir) [km] | 75.8 | 47.7 | 17 x 29 | 27 x 45 |
| pixel at end-of-scan ⊥ [km] | 125.1 | 71.3 | 29 | 45 |
| pixel at end-of-scan II [km] | 414.3 | 213.4 | 17 | 27 |
| $S_l$ [swarth length, km] | 2191.4 | 1840.1 | 1642.3 | 1333.6 |
| DGSS active window dwell time/sat-pass ($T_{dwell}$) [sec] | 48.1 | 48.0 | 47.6 | 20.4 |
| DGSS active window width [km] | 424 | 335 | 263 | 168 |
| DGSS active window length [km] | 2606 | 2053 | 2206 | 1587 |

FIG. 4

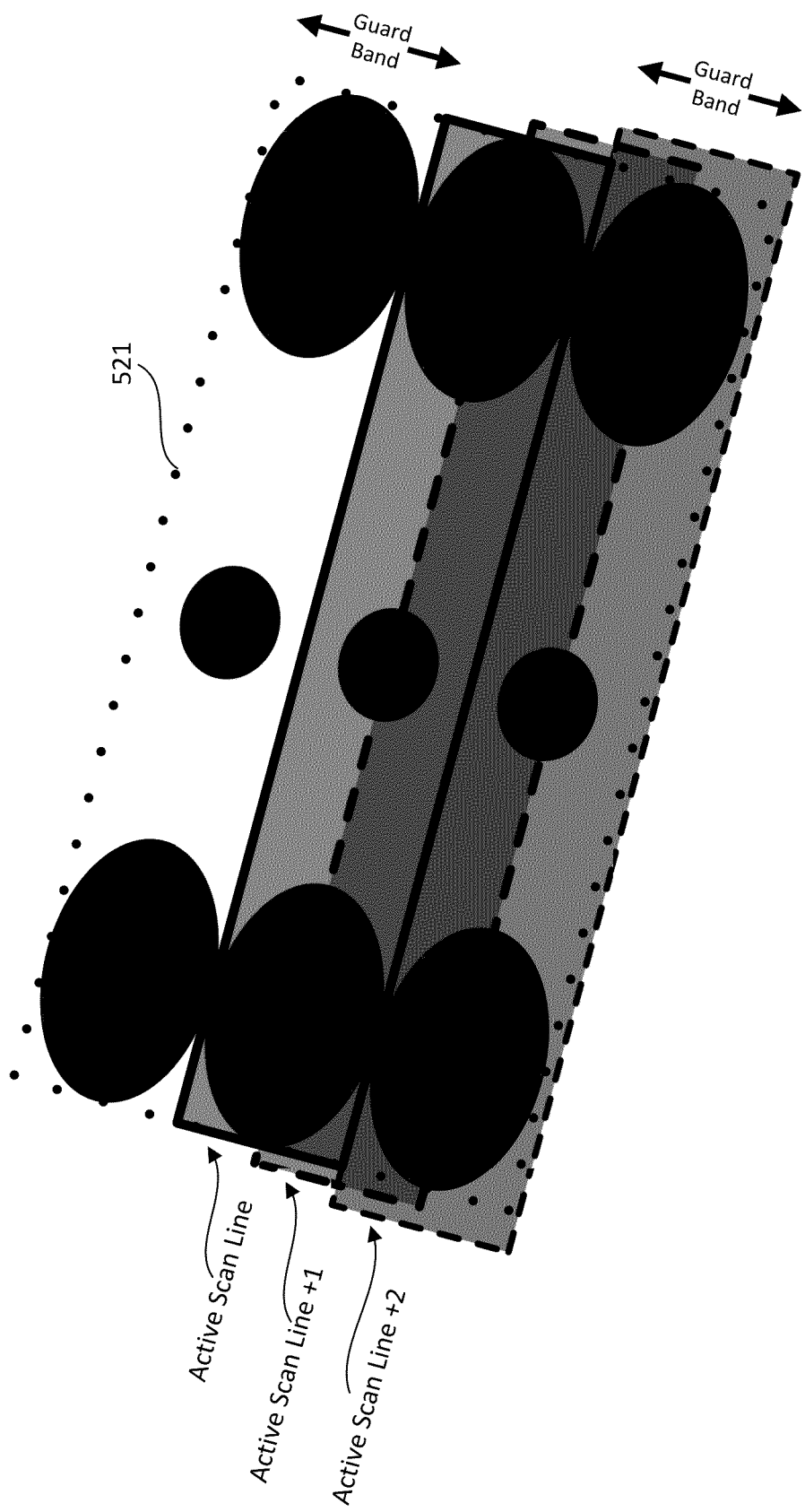

DYNAMIC GEOGRAPHICAL SPECTRUM SHARING

CROSS REFERENCE TO RELATED APPLICATIONS

This application is a continuation of and claims priority to U.S. Pat. Application No. 17/391,326, filed Aug. 2, 2021, which is a continuation of and claims priority to U.S. Pat. Application No. 16/991,591 (now U.S. Pat. No. 11,095,361), filed Aug. 12, 2020, which is a non-provisional of and claims priority to U.S. Provisional Pat. Application No. 62/938,606, filed Nov. 21, 2019, and U.S. Provisional Pat. Application No. 62/891,265, filed Aug. 23, 2019, each of which is hereby incorporated by reference in its entirety.

BACKGROUND

The electromagnetic spectrum has been used for various applications or services. Portions (e.g., bands) of the spectrum are designated for certain services and/or entities. The radio frequency (RF) portion of the spectrum is regulated by the Federal Communications Commission (FCC) and the National Telecommunications and Information Administration (NTIA). For example, certain frequency bands are set aside for sensors onboard satellites while other frequency bands are set aside for wireless broadband.

The FCC conducts auctions to license portions of the spectrum. For example, wireless broadband providers can purchase a license to use a portion of the spectrum for their networks. In some cases, technologies are developed around using a certain portion of the spectrum, and it may be difficult (e.g., costly, time consuming, etc. or due to standards, laws, regulations, agreements, politics, etc.) to adapt a technology to use a different portion of the spectrum. Also, certain technologies perform better (e.g., achieve higher quality results) in certain bands or require operating in certain bands.

Over time, the number of services using portions of the spectrum has increased. Because the spectrum is a finite resource, the demand for using the spectrum has increased accordingly. In particular, the demand for certain portions of the spectrum has increased with the emergence of wireless broadband technologies, like 5G.

Spectrum has become a scarce resource. The addition of services, like 5G, using the spectrum has led to a crowded field of users. In some cases, different users may be using frequencies of the spectrum that are close, or even adjacent. Because of the phenomenon that energy on one frequency may leak over to another frequency (e.g., out of band emissions), conflicts may arise between different users or potential users of spectrum. One such conflict has arisen between incumbent users of sensors on Earth exploration satellites and users of 5G. Sensors on satellites evaluate RF signals in the 23.60-24.00 GHz band to measure atmospheric water and ice for weather forecasting and weather analysis. Incumbent users of these sensors and others interested in the measurements are concerned that out of band emissions from 5G transmissions, particularly transmissions in the New Radio (NR2) band of 24.25-27.50 GHz, will corrupt the sensor measurements for atmospheric water and ice. Similarly, there are concerns that out of band emissions from other NR2 bands will corrupt other sensor measurements taken by sensors operating in other bands close, or adjacent, to the other NR2 bands.

SUMMARY

This section provides a short summary of certain features discussed in the detailed description. This summary is not an extensive overview and is not intended to identify key or critical elements.

This disclosure introduces the concept of dynamic geographical spectrum sharing (DGSS) by Earth exploration satellite services (EESS). Methods, apparatuses, computer-readable mediums for storing software, and systems for DGSS are described herein. More specifically, this disclosure describes methods, apparatuses, computer-readable mediums for storing software, and systems for sharing electromagnetic spectrum used by sensors onboard Earth exploration satellites. Aspects of this disclosure are particularly applicable to spectrum sharing by passive sensors for measuring atmospheric water in the 23.6-24.0 GHz band and other bands (see Table II) onboard Earth exploration satellites and 5G networks. Aspects of this disclosure include determining an instantaneous field of view (IFOV) and modifying transmission characteristics while network antennas and the power radiated by such antennas are within the IFOV. Various means for modifying transmission characteristics are disclosed. In some embodiments, transmission characteristics are modified by leveraging current mechanisms in 4G and 5G networks designed to cope with loss of band availability due to signal fading or network congestion, and to permit network control of user equipment transmission power.

Implementing DGSS according to aspects of this disclosure may produce a time-dependent, geographical guard band. DGSS may identify and/or resolve conflicts between users of the spectrum. For example, DGSS may resolve the conflict between the incumbent users of atmospheric water sensors onboard Earth exploration satellites and 5G providers. An advantage of DGSS may be that services operating in close, or even adjacent, frequency bands can coexist. Specifically, using DGSS, services in one band may be protected from out of band emissions from services in another band. In particular, DGSS may protect measurements of satellite sensors operating in the 23.60-24 GHz band from corruption by out of band emissions of 5G transmissions in the nearby 24.25-27.50 GHz band. Likewise, DGSS may protect measurements of sensors operating in other bands from corruption of out of band emissions of 5G transmissions in additional bands nearby those other bands.

In some cases, DGSS may allow for services to operate in adjacent, or even overlapping, frequencies. Thus, DGSS may allow for services to operate in parts of the spectrum that might otherwise be reserved as a guard band. Accordingly, DGSS may lead to more efficient use of the spectrum.

These and other features and advantages are disclosed in the accompanying drawings and detailed description below.

BRIEF DESCRIPTION OF THE DRAWINGS

Some features are shown by way of example, and not by limitation, in the accompanying drawings. In the drawings, like numerals may reference similar elements.

FIG. 4 illustrates an example data structure in accordance with aspects of this disclosure.

FIG. 5 illustrates an example active window in accordance with aspects of this disclosure.

DETAILED DESCRIPTION

Figure 1:
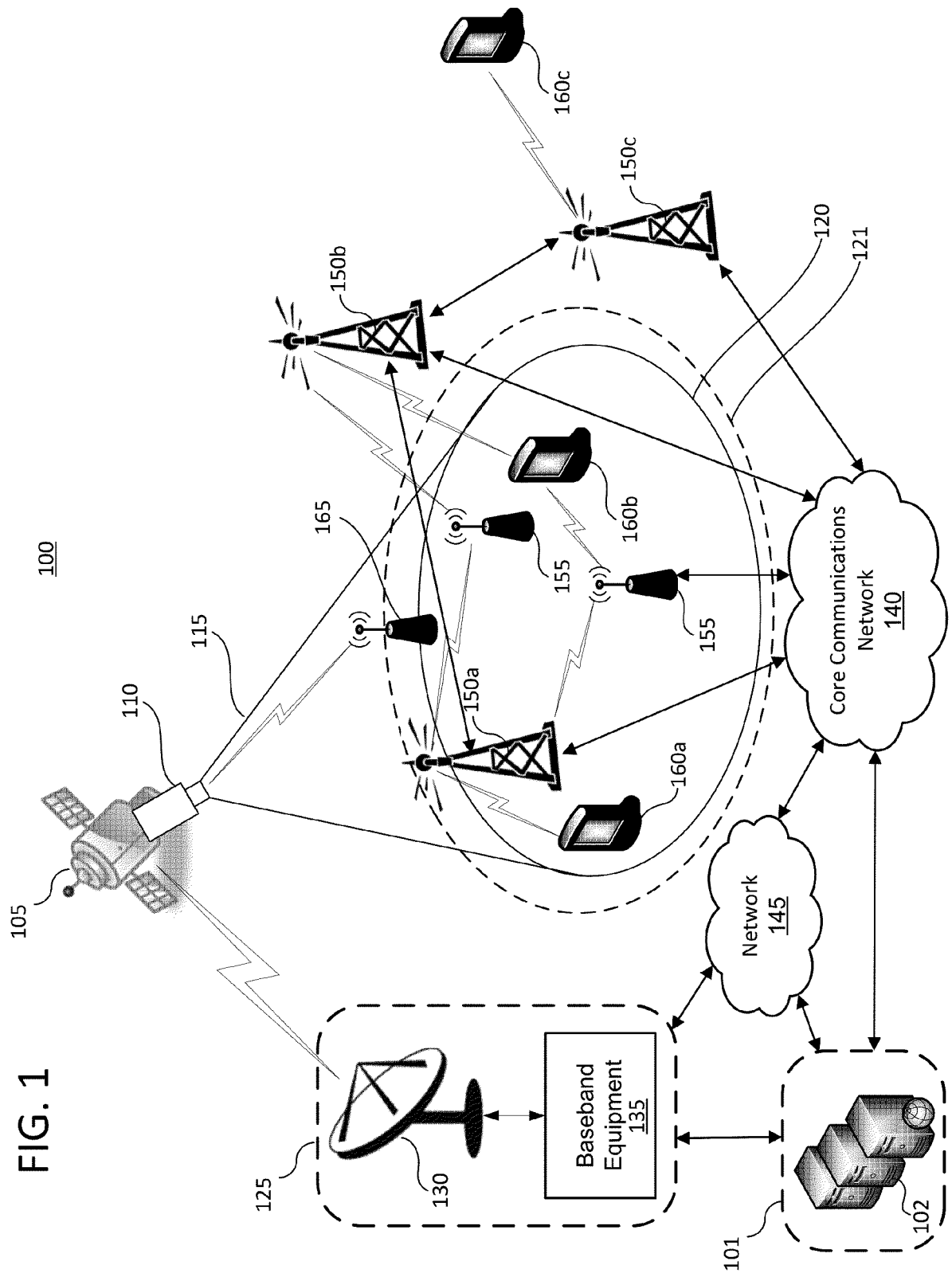
FIG. 1 illustrates an example system in accordance with aspects of this disclosure.

The accompanying drawings, which form a part hereof, show examples of the disclosure. It is to be understood that the examples shown in the drawings and/or discussed herein are non-exclusive and that there are other examples of how the disclosure may be practiced.

Out of band emissions from 5G transmissions in proposed millimeter-wave (mm-wave) spectrum between 24 and 86 GHz (New Radio 2 or NR2 bands) have the potential to corrupt sensitive measurements of atmospheric water vapor and ice in adjacent spectral bands allocated to satellites in Earth's orbit. These measurements provide critical data for weather forecasting, and for analyzing current and past weather events (e.g., for understanding extreme weather events). A new mechanism — Dynamic Geographical Spectrum Sharing (DGSS) — that allows for multiple services to share electromagnetic spectrum is described. DGSS may protect the water and ice measurements, as well as other measurements, at no or very modest cost to wireless network availability (e.g., 5G network availability). Interference between wireless communications (e.g., 5G communications) and the measurements by satellite sensors (e.g., atmospheric water measurements) may be avoided by modifying wireless transmission characteristics while the transmitting mobile network antennas (and the power radiated by these antennas) are within an instantaneous field of view (IFOV) of the satellite-based measurement sensor (e.g., radiometer). A sensor's IFOV may be predicted with a relatively high degree of accuracy. Because the sensor's IFOV may include a given area on the earth's surface for a short period of time (e.g., microseconds, milliseconds, seconds, etc.), and because there are already mechanisms in 4G and 5G networks designed to cope with loss of band availability, e.g., due to signal fading or congestion and/or mechanisms to permit network control of base station transmission power, a DGSS system can exploit these capabilities to maintain levels of network availability consistent with those targeted by wireless broadband providers.

FIG. 1 illustrates an example DGSS system 100. In FIG. 1, arrows indicate links between different devices and/or networks. The links may include one or more wired connections (e.g., fiber, coax, Ethernet, Universal Serial Bus (ISB), etc.), one or more wireless connections (e.g., satellite links or 802.11 links), or a combination of both (e.g., fiber for the first leg and 802.11 for the second leg). Also, each link may include one or more routers, switches, connectors, etc. to complete the path of communication.

The DGSS system 100 may include DGSS logic 101, which may include one or more hardware and/or software components. As shown in FIG. 1, the DGSS logic 101 may include one or more DGSS servers 102 or other devices interconnected by a wired (e.g., databus) and/or wireless network. More specifically, the DGSS logic 101 may be implemented with various types of memory, such as a hard drive, read-only memory (ROM), random access memory (RAM), removable memory (e.g., a CD, DVD, USB drive, etc.), and/or other types of storage, for maintaining one or more databases and/or instructions (e.g., computer-executable instructions, computer applications/programs, or code). For example, the DGSS logic may include a database for storing satellite and/or sensor data and another database for storing DGSS policies (e.g., quality of service (QoS) policies). The various databases that may be implemented as part of the DGSS logic 101 will be understood from this disclosure. It should also be understood that memory of the DGSS logic 101 for maintaining the database(s) may be separate from or combined with memory storing the instructions. As will be understood from this disclosure, there may be one or more computer applications/programs for execution by one or more processors of the DGSS logic 101 or other components of the DGSS system 100.

The DGSS logic 101 may also include one or more processors (e.g., microprocessors), one or more controllers (e.g., microcontrollers), one or more logic gates (including one or more transistors (e.g., field effect transistors (FETs), bipolar junction transistors (BJTs), etc.)) or other circuit elements (e.g., registers), and/or one or more integrated circuits (ICs). The one or more ICs may be an Application Specific Integrated Circuit (ASIC) having specific logic dedicated to performing a specific operation among the operations described herein, such as predicting active windows and instructing communications networks (e.g., 5G networks) to modify transmission characteristics and/or traffic based on the active window predictions.

FIG. 1 also illustrates a satellite 105. The satellite 105 may perform various functions (e.g., communications, data gathering, etc.). In some embodiments, the satellite 105 may be a satellite for exploring Earth. In some embodiments, the satellite 105 may be a weather satellite for collecting data that may be used to analyze and predict weather on Earth. It may be various orbits including sun-synchronous polar orbits, low earth equatorial orbits, or geosynchronous orbits. The satellite 105 may be a private or government operated satellite. For example, the satellite 105 may be operated by the National Oceanic and Atmospheric Administration (NOAA), National Aeronautics and Space Administration (NASA), and U.S. Department of Defense (DOD). Other countries may have similar governmental organizations for operating satellites that the satellite 105 may also correspond to. In particular, the satellite 105 may be NOAA-20 (which is a satellite operated by NOAA), DMSP 5D-3 F18 (which is a satellite operated by the DOD), or METOP-C (which is a satellite operated by the European Space Agency (ESA)). Although the DGSS system 100 in FIG. 1 illustrates a single satellite, it will be appreciated that multiple satellites 105 may be a part of any single DGSS system. In one embodiment, the DGSS system 100 may include one or more of a plurality of Earth exploration satellites equipped with at least one sensor analyzing signals in a particular band (e.g., 23.60-24.00 GHz).

The satellite 105 may include numerous components and may have a variety of configurations/structures. In any event, the satellite 105 may include a sensor 110. The sensor 110 may be any sensor for exploring Earth. For example, the sensor 110 may be a sensor for measuring water vapor and ice in Earth's atmosphere. The sensor 110 may obtain such measurements by analyzing signals in a particular band (e.g., 23.60-24.00 GHz). More specifically, water vapor and ice in Earth's atmosphere may emit signals in the 23.60-24.00 GHz band, and sensor 110 may receive the signals. The sensor 110 may be a passive sensor, and might not have to emit any signal in order to obtain measurements. From the measurements it takes, the sensor 110 may create a water vapor profile. The sensor 110 may be implemented with various configurations and coupled (e.g., attached) to the satellite in a variety of ways and locations. The sensor 110 may be configured according to various specifications and thus have different sensitivities in different embodiments. Examples of sensor 110 include ATMS, AMSU-A, AMSR-2, SSMIS, GMI, and MWRI. Although the DGSS system 100 in FIG. 1 illustrates a single sensor 110 on the satellite 105, it will be appreciated that multiple sensors 110 may be on a single satellite 105. Also, in some embodiments of the DGSS system 100, there may be multiple satellites 105, each carrying a sensor 110, and those sensors 110 may have similar or different configurations and/or specifications. Moreover, while the sensor 110 is shown as a single component, the sensor 110 may include multiple components working together to take measurements. For example, the sensor 110 may include an imaging device, which may be fixed to the satellite 105, and a reflector that is rotatably mounted to the satellite 105. In some embodiments, the sensor 110 may be defined to perform a conical or cross-track scan. For example, the sensor 110 may scan in a swarth perpendicular to the direction that the satellite 105 travels.

As shown in FIG. 1, the sensor 110 may be configured to collect data for a particular field of view at a particular point in time, referred to herein as an instantaneous field of view (IFOV) 115 because the satellite 105 continuously moves. Thus, the IFOV 115 continuously changes as the satellite 105 moves over the Earth. The size and shape of the IFOV may also change where the sensor 110 itself moves (e.g., pivots or rotates in addition to the movement of the satellite 105). For example, size and shape may change with the change in angle between the sensor 110 and the Earth. Also, the size and shape of the IFOV 115 may be different for different sensors 110. In some embodiments, the IFOV 115 may be the three dimensional space defined by the half power (e.g., 3 dB) point in the normalized antenna pattern of the sensor. In other embodiments, the IFOV 115 may correspond to the angular parameters in which the power received by the sensor is an acceptable fraction (e.g., 75%, 99%, etc.) of the total power in the far field.

The projection of the IFOV 115 onto Earth's surface provides a pixel (or spot) 120. As explained in more detail herein, the pixel 120 may be calculated based on a number of factors including position of the satellite 105 and orientation of the sensor 110. In some embodiments, the pixel 120 may be determined by assuming that the Earth is flat. Alternatively, the pixel 120 may be determined by accounting for the curvature of the Earth. The pixel 120 may take various shapes and its shape may change over time. In some embodiments, the pixel 120 may be a circle at nadir (directly below the satellite 105, and more specifically the sensor 110) and may take on an elliptical shape as the sensor 110 scans at an angle.

The pixel 120 may be used to determine an active window 121. The active window 121 may be an area including the pixel 120 plus a guard band. The guard band may be an area around the pixel 120 that is determined to account for uncertainties in determining the pixel 120 (e.g., determining the location of the satellite 105 or determining the position of the sensor 110 for determining the IFOV 115.) In some embodiments, the active window 121 may have a similar shape as the pixel 120. In other embodiments, the active window 121 may have a different shape than the pixel 120. As described further herein, the active window 121 may be determined in a DGSS system 100 and used to determine which communications network elements are to be controlled (e.g., which user equipment will be moved to a different band, which base stations will require transmission power reduction, etc.)

FIG. 1 also illustrates a ground station (or hub) 125 for communicating with the satellite 105 and/or sensor 110. This communication may be bi-directional. In some embodiments, the ground station 125 may receive the sensor's measurements from the satellite 105. For example, the ground station 125 may receive measurements of Earth's atmospheric water vapor collected by the sensor 110 as well as data regarding the orientation of the sensor 110 (e.g., a beacon signal indicating that the sensor 110 is at a start position for beginning a new scan, such as a scan line in a cross-track scan). The ground station 125 may also be used to transmit instructions to the satellite 105, such as instructions for controlling the sensor 110. For example, the ground station 125 may instruct the satellite 105 to calibrate the sensor 110. As another example, the ground station may send a message to query the satellite 105 and/or sensor 110 for information (e.g., sensor orientation information). It should be understood that different satellites 105 and sensors 110 may utilize different communication protocols, and thus, the DGSS logic 101 may include different modules for managing communications and processing data for the different satellites 105 and sensors 110.

The ground station 125 in FIG. 1 is shown as including an antenna 130 and baseband equipment 135, but it may include other components as well. The antenna 130 may be configured to communicate with specific satellites 105. The baseband equipment 135 may control the antenna 130 and communications between the antenna 130 and satellite 105. The baseband equipment 135 may include one or more filters, amplifiers, modulators, or other signal control elements (e.g., modulation and coding (MODCOD) elements). The baseband equipment 135 may also include an interface for communicating with the DGSS logic 101 as well as other networks, such as network 145 (e.g., Internet). In some embodiments of the DGSS system 100, the baseband equipment 135 may be configured to interface with the DGSS logic 101 to provide the DGSS logic 101 with location information of the satellite 105, orientation information of the sensor 110, and/or measurements taken by the sensor 110. Although only one ground station 125 is shown in FIG. 1, the DGSS system 100 may include multiple ground stations 125 for communicating with the satellite 105 or other satellites. Accordingly, the DGSS logic 101 may be configured with different modules for communicating with the different baseband equipment 135, of the different ground stations 125, which may operate using different communication protocols and standards. For example, the DGSS logic 101 may have different modules for interfacing with the baseband equipment 135 communicating with a satellite 105 operated by NOAA and the baseband equipment 135 communicating with a satellite 105 operated by the European Space Agency (ESA).

FIG. 1 illustrates how the DGSS logic 101 may provide an interface between the ground station 125 (and thus satellite 105) and a core communications network 140. The core communications network 140 may be the core network of a telecommunications provider. For example, the core communications network 140 may be a core communications network for a 4G network, 5G network, or hybrid 4G/5G network. The core communications network 140 may include a plurality of databases and computing devices (e.g., servers) linked together to form a network (e.g., a local area network (LAN) or wide area network (WAN)) for operating a telecommunications network. Different telecommunications providers implement their networks differently, even though they may operate under similar protocols or specifications (e.g., 5G), and thus, no particular architecture for the core communications network 140 is required. However, additional details should be understood from the example of the core communications network 140, namely a 4G Evolved Packet Core, discussed below. It should also be understood from this disclosure that the DGSS logic 101 may be implemented as a layer (e.g., a layer of the Open Systems Interconnection (OSI) model, such as a network layer) on top of the core communications network 140. Or, the DGSS logic 101 may be integrated into a layer (e.g., network layer) of the core communications network 140. Moreover, one or more modules or components of the DGSS logic 101 may be integrated into one or more layers (e.g., network and/or application layers) of the core communications network 140, such that the DGSS logic 101 is split between a separate layer and existing layer(s) of the core communications network 140.

While FIG. 1 illustrates a single core communications network 140, the DGSS system 100 may include multiple core communications networks 140 for multiple telecommunication providers. In such examples, the DGSS logic 101 may be configured to interface with multiple core communications networks 140. Different telecommunication networks may use different protocols, so the DGSS logic 101 may include different modules for interfacing with the different core communications networks 140.

The core communications network 140 may be connected to a network 145 for communicating with other networks or devices to operate a telecommunications network or for providing customers with access to various media (e.g., webpages, video, images, audio, computer applications, etc.). The network 145 may be the Internet. Accordingly, the core communications network 140 may enable users or customers of a telecommunications network to access the Internet to retrieve media or communicate with other users of the same or a different network. In some embodiments, the network 145 (e.g., the Internet) may also be used to connect the DGSS logic 101 to the core communications network 140 and/or the ground station 125. Moreover, in some instances, the network 145 may connect the core communications network 140 to the ground station 125, so that the core communications network 140 and ground station 125 may communicate directly.

The core communications network 140 may also be connected (via a wired (e.g., fiber) or wireless connection) to a plurality of base stations 150 (e.g., gNB or gNodeB, eNB, etc.) as well as other network elements, such as relays 155. FIG. 1 illustrates three base stations 150*a-c*, but it should be understood that the DGSS system 100 may include many base stations 150. The base stations 150 may include antennas for communicating with user equipment (UE) 160. Each base station 150 may communicate with a plurality of user equipment 160. The communications between the base stations 150 and user equipment 160 may include bi-directional wireless signaling and bearer channels (e.g., standalone 5G communications), or the signaling and bearer channels can be uni-directional and split between multiple radio frequency bands (e.g., 5G at 24 GHz, and 4G at 700 MHz, or 5G at 24 GHz and 5G at 700 MHz). FIG. 1 illustrates the user equipment 160 as a mobile phone (e.g., cellular phone, smartphone, or handset), but the user equipment may be any end device, such as a tablet, laptop, desktop computer, LAN phone, vehicle (e.g., car, truck, bus, boat, aircraft) computer, home media equipment (e.g., set-top box, stereo system, local media server, etc.), security system, camera, smart wearable device (e.g., smart-watch, smart-glasses, smart-headphones, etc.), Internet of Things (IOT) devices, or sensors. The user equipment 160 may be configured to communicate using various protocols or specifications (e.g., 4G and 5G).

The base stations 150 may have different configurations (e.g., different antennas or arrangements of antennas) and different capabilities (e.g., different transmission power, different coverage areas, etc.). The base stations 150 may be stationary (or nonstationary) and positioned at specific geographical locations to ensure a certain overall network availability (e.g., to ensure a high (e.g., 99.99%) worst-case network availability). Also, although each of the base stations 150 in FIG. 1 are shown as communicating with the core communications network 140, it should be understood that the DGSS system 100 may include base stations 150 operated by different telecommunications providers and thus connected to different core communications networks 140.

As shown in FIG. 1, one or more relays 155 may be used to connect base stations 150 together or to connect a base station 150 to user equipment 160. Relays 155 may have antennas for receiving and transmitting wireless communications (e.g., 5G communications). The base stations 150 may also be interconnected via various wired and/or wireless links.

As disclosed herein, the DGSS logic 101 may operate to control (e.g., modify) traffic and transmission characteristics of the base stations 150, relays 155, and/or user equipment 160. More specifically, the DGSS logic 101 may operate to control traffic and transmission characteristics of specific base stations 150, relays 155, and/or user equipment 160 of a telecommunications network that are positioned within the active window 121, which changes locations over time. Further, the DGSS logic 101 may also control one or more beacons 165, which may be located within the pixel 120 and may transmit a beacon signal that the satellite 105 and/or sensor 110 may detect for purposes of determining a location of the pixel 120. Alternatively, the one or more beacons 165 may operate independently from the DGSS logic 101. Additional discussion of the beacons 165 is provided below.

FIG. 1 illustrates several example scenarios to describe various effects of the DGSS system 100. In a first scenario, base station 150*a* is wirelessly communicating (e.g., via a 5G communication) with user equipment 160*a*. This wireless communication may be bidirectional and may be for any of a plurality of services (e.g., phone service, video conferencing, Internet access (download or upload), media streaming, handshaking, etc.) or it may be uni-directional and split between multiple radio frequency bands (e.g., 4G and 5G, or 5G in different frequency bands) and still deliver a plurality of services (e.g., phone service, video conferencing, Internet access (download or upload), media streaming, handshaking, etc.). In particular, the wireless communication between base station 150*a* and user equipment 160*a* may be in the 24.25-27.50 GHz NR2 band. Both the base station 150*a* and user equipment 160*a* are within the active window 121. Therefore, to protect measurements by sensor 110 (e.g., measurements of energy in the 23.60-24.00 GHz range) from out of band emissions of the wireless communication, the DGSS logic 101 may modify transmission characteristics of the base station 150a and/or user equipment 160a. For example, the DGSS logic 101 may reduce (or even turn off) the power of the antennas of the base station 150a and/or user equipment 160a. This modification may be temporary. For example, this modification might only last as long as the base station 150a and/or user equipment 160a are within the active window 121. Once the active window 121 changes (e.g., because the IFOV of the sensor 110 changes due the scanning of the sensor 110 and movement of the satellite 105) so as not to include the base station 150a or user equipment 160a, the power of the antenna(s) may be restored. This may be implemented using a timer within the base station 150a and/or user equipment 160a, such that they automatically return to full power after a certain time, or an additional signal (in addition to the power down signal) from the DGSS logic 101 that causes the base station 150a and/or user equipment 160a to return to full power.

Additionally, or alternatively, the DGSS logic 101 may cause the base station 150a and/or user equipment 160a to move to a different band (e.g., switch from communicating in the 24.25-27.50 GHz NR2 band to communicate in the 700 MHz conventional LTE band). In some embodiments, the DGSS logic 101 may determine the specific band (or specific frequency) that the base station 150a and/or user equipment 160a should switch to. The DGSS logic 101 may determine the specific band randomly or based on network traffic measurements or predictions. For example, if the DGSS logic 101 determines that the 31.80-33.40 GHz band already has a lot of traffic within the active window 121, it might cause the base station 150a and/or user equipment 160a to instead switch to the 81.00-86.00 GHz NR2 band. Because the DGSS logic 101 may control multiple (e.g., hundreds or thousands) base stations 150 and user equipment 160 within the active window 121, it may distribute their communications across various bands (e.g., 20% of base stations and user equipment 160 may be directed to the 31.80-33.40 GHz band, 20% may be directed to the 37.00-40.50 GHz band, and so on.) Again, it should also be understood that these modifications to the traffic of the base station 150a and/or user equipment 160a inside the active window 121 may be temporary. For example, the DGSS logic 101 may perform these modifications only for a certain period of time (e.g., as long as the base station 150a and/or user equipment 160a are within the active window 121). Once the active window 121 moves off of the base station 150a and/or user equipment 160a, they may operate as normal.

From this description of the first scenario, it should be understood that by controlling the base station 150a, the DGSS 101 may also affect communications between the base station 150a and any other user equipment 160 (inside or outside the active window 121) besides the user equipment 160a. For example, by turning down the power of the antenna at base station 150a, the DGSS logic 101 may cause a communication between the base station 150a and a user equipment 160 outside the active window 121 to be interrupted. In such circumstances, the user equipment 160 outside the active window 121 may, e.g., using 4G and 5G mechanisms for dealing with loss of band availability, communicate with another base station 150 outside the active window. In this way, from the end user's perspective, there may be no loss in network availability.

FIG. 1 also illustrates another scenario where the user equipment 160b, within the active window 121, is communicating with the base station 150b that is outside the active window 121. Through the base station 150b, the DGSS logic 101 may instruct the user equipment 160b to modify its transmission characteristics (e.g., reduce power or switch frequencies). In this way, the DGSS logic 101 might not only function to limit power, in a particular band (e.g., 23.60-24.00 GHz), from antennas of base stations 150 within the active window 121, but rather, may also limit power, in the particular band, from user equipment 160 within the active window 121. Notably, the base station 150b, which is outside the active window, may continue to use the particular band (e.g., 23.60-24.00 GHz) with other user equipment outside the active window 121.

FIG. 1 further illustrates the scenario where the base station 150c and user equipment 160c are both outside the active window 121. This scenario is illustrated to explain that the DGSS logic 101 may be able to distinguish the base station 150c and user equipment 160c from other base stations and user equipment inside the active window 121. Because the base station 150c and user equipment 160c are both outside the active window 121, the DGSS logic 101 might not modify communications between them. In this way, the DGSS system 100 limits its impact on the overall availability of the telecommunications network.

From the entirety of this disclosure, it should be appreciated that DGSS may provide several advantages. One advantage is that DGSS may mitigate interference from out of band emissions by mm wave 5G networks (and other applications) at all frequency bands, and it can be applied to different frequency bands separately. For example, if satellite A supports band f1, and satellite B supports band f2, DGSS can be implemented for each band independently using separate windows in which DGSS actively provides interference protection. Moreover, the mix of satellites that DGSS applies to can be changed dynamically. For example, if satellite A at frequency band f1 needs to be replaced by satellite C at the same frequency, DGSS can be adapted with relatively low costs and effort. The adaptation may be performed by changing a policy in a table through a policy portal of a DGSS system, and therefore, may take effect quickly.

In addition, because DGSS may mitigate the desire or need for frequency guard bands between applications or services, portions of the spectrum currently reserved for guard bands can be allocated for other uses. Thus, DGSS may augment the amount of spectrum available for other applications or services (e.g., communication applications). In particular, because this solution does not depend on a frequency guard band to insulate the passive sensor measurements from 5G transmissions, the spectrum reserved for guard bands can be repurposed to enable additional bandwidth for 5G communications.

Yet another advantage may be realized in testing for interference. Compared to simulations of the emissions from 5G deployments (which may be complex to calculate, depend on numerous assumptions and parameters, and are difficult to test as they require some mechanism to geographically simulate a full 5G deployment), DGSS implementations may be easier to simulate and test. A DGSS system may depend on its ability to accurately determine the geo-location of a given satellite's IFOV and ability to modify a communication network's (e.g., 5G network's) traffic and transmission characters. Both of these abilities may be comparatively easier to simulate and test for compliance.

A DGSS implementation can be easily adjusted for changes in the noise floor of the sensor taking measurements (e.g., radiometer measuring water vapor). This "future proofs" the solution for protecting measurements against out of band emissions as sensors with lower noise floors become available. DGSS may resolve disputes over the choice of a sensor when defining emission limits because it might not be very sensitive to the specific parameters or capabilities of the sensors it's protecting.

Although some embodiments disclosed herein discuss mitigating interference between 5G devices and EESS passive sensor measurements in the mm-wave spectrum, it should be understood that DGSS has wider applicability. DGSS may apply to all broadband providers using mm-wave spectrum. Moreover, DGSS may be used in other spectrums. DGSS may also be applied to mitigate interference between various devices and networks, not only between 5G networks and EESS sensors. Similarly, although some embodiments describe specific architectures and protocols like those promulgated by the 3GPP consortium, it is contemplated that not all broadband network providers will use such open standards architecture(s) and protocols. At least some providers might use proprietary architectures and network elements based on an IEEE 802.11 (WiFi) protocol or other protocols. DGSS can also apply to other mechanisms for managing time and geographical spectral interference. Examples of applying DGSS for other forms of interference management include sharing uplink/downlink spectrum between a ground station and satellite (e.g., in low earth orbit) with local area (e.g., WiFi) or wide area (e.g., 4G/5G) networks, or sharing mm-wave spectrum with intermittent radar used by radars on aircraft.

As discussed, in some embodiments, DGSS may be used to protect data (e.g., measurements) from one or more sensors on one or more Earth exploration satellites from corruption by out of band emissions of one or more 5G transmissions. The sensors may include a passive sensor that is aimed at the Earth's surface and configured to measure energy emitted from atmospheric water vapor and ice at certain frequencies within the sensor's field of view, e.g., a column of the atmosphere between the passive sensor and Earth that corresponds to its IFOV because the sensor is onboard a moving satellite. The passive sensor (also referred to as a radiometer or sounder) measures these emissions and may create a water vapor profile that may be used for weather analysis or forecasting. At least one Earth exploration satellite is equipped with such passive sensor, and there may be more either now or in the future. Table 1 (below) shows bands reserved for such passive EESS sensors and similar EESS sensors and 5G NR2 bands that might cause interference.

TABLE 1

| EESS Sensor Band (GHz) | 5G NR2 Band (GHz) |
| --- | --- |
| 23.60-24.00 | 24.25-27.50 |
| 31.30-31.80 | 31.80-33.40 |
| 36.00-37.00 | 37.00-40.50 |
| 50.20-50.40 | 47.20-50.30 |
| 50.20-50.40 | 50.40-52.60 |
| 86.00-92.00 | 81.00-86.00 |

DGSS may protect measurements by EESS sensors in these mm-wave bands from interference. The interference occurs when the cumulative out of band emissions from antennas in a sensor's (e.g., radiometer's) IFOV is equal to or exceeds the noise floor of the sensor. In such circumstances, the sensor might not be able to filter out the power from the out of band emissions.

Figure 2:
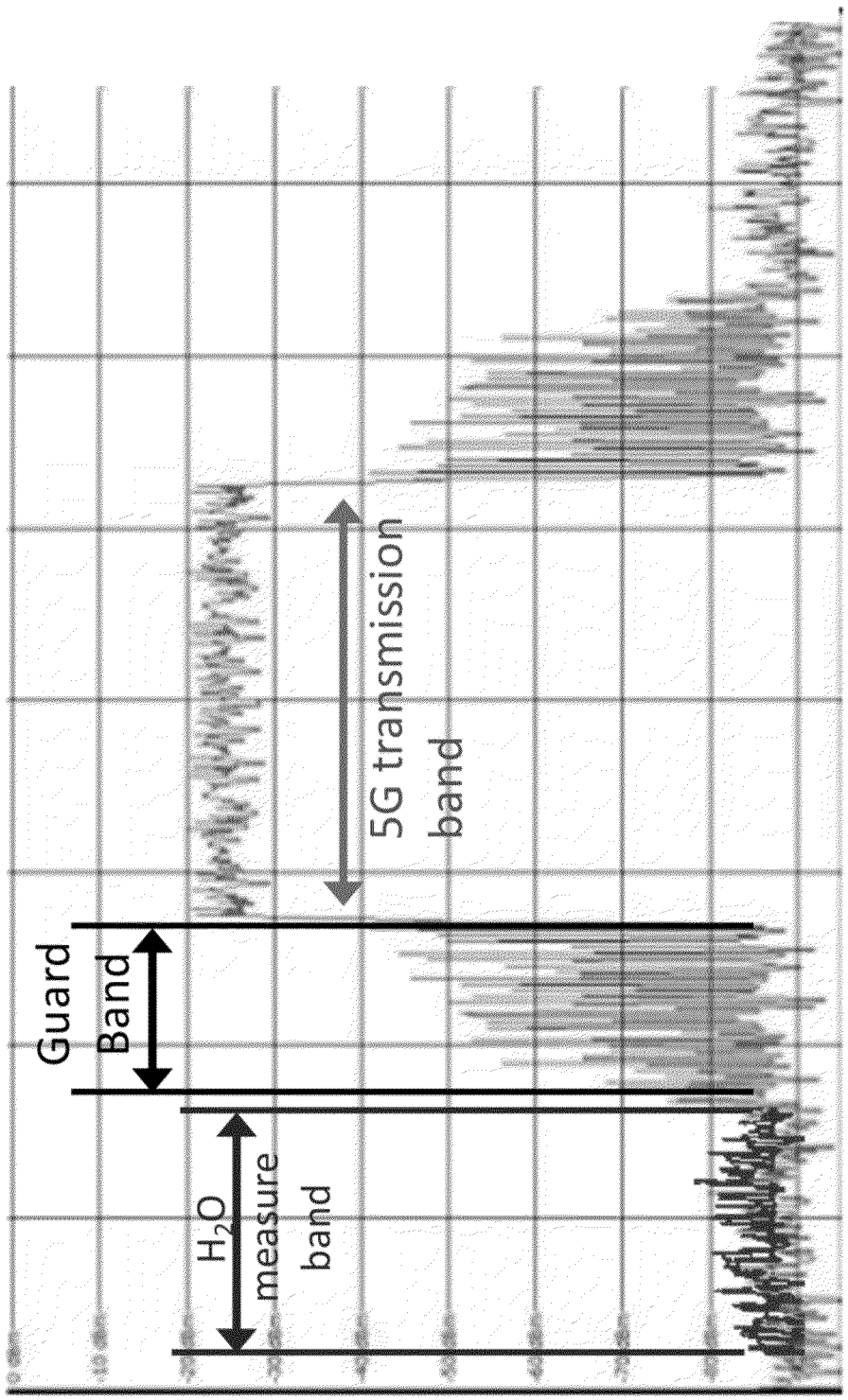
FIG. 2 illustrates an example of interference caused by out of band emissions.

FIG. 2 illustrates how out of band emissions from 5G transmissions may interfere with the signals being measured in an EESS sensor band. FIG. 2 illustrates the 23.60-24.00 GHz EESS sensor band, the 24.25-27.50 GHz 5G band, and the 24.00-24.25 GHz guard band that has been set aside as a buffer between the 5G band and EESS sensor band. As shown in FIG. 2, power from 5G transmissions may leak out into the guard band and further out into the EESS sensor band. The power of such out of band emissions in the EESS sensor band may be strong enough to corrupt measurements of emissions from water vapor and ice that are taken by sensors on board earth exploration satellites. Even if the power of the out of band emissions is generally below the power of the emissions from water vapor and ice as depicted in the FIG. 2 example, the power of the out of band emissions may still be high enough to corrupt the measurements. DGSS accounts for this possibility by allowing 5G networks and EESS sensors to share the 23.60-24.00 GHZ band.

Figure 3:
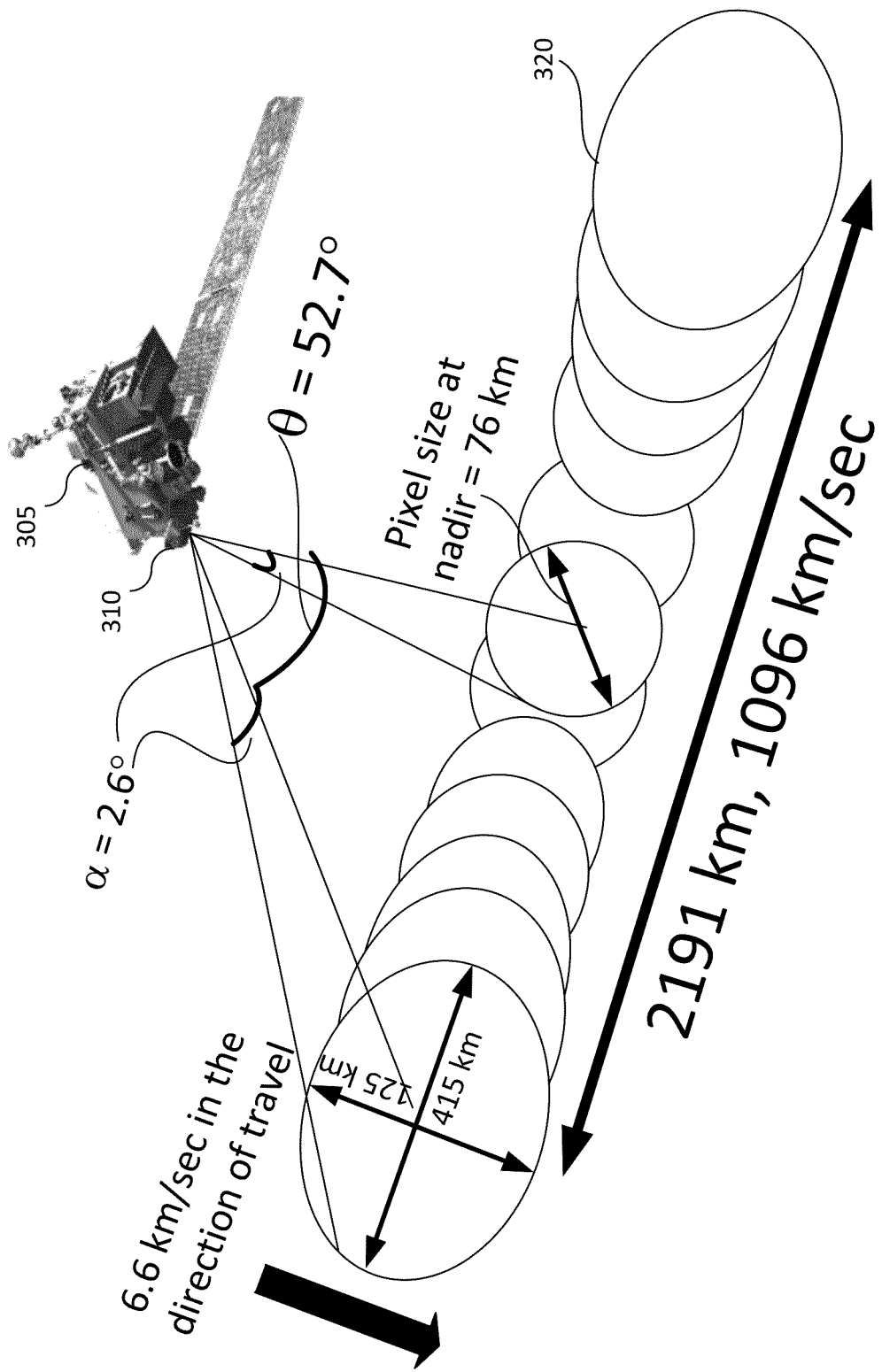
FIG. 3 illustrates an example scan geometry in accordance with aspects of this disclosure.

FIG. 3 illustrates a sensor's scan geometry. FIG. 3 depicts a satellite 305 carrying a sensor 310. In some embodiments, the satellite 305 may be the NOAA-20 satellite and the sensor 310 may be the Advanced Technology Microwave Sounder (ATMS). Since the early 1970's, a progression of ever more sensitive sensors (e.g., radiometers) have flown on weather satellites in sun-synchronous, near polar low earth orbits. Atmospheric water vapor and temperature profiles may be derived from measurements of radiance and absorption from water vapor and oxygen at resonant frequencies between 23.8 GHz and 183.3 GHz. Satellites typically use cross-track or conical scanning sensors (e.g., radiometers). The ATMS is a cross-track radiometer currently used for weather forecasting by NOAA. For this reason, this disclosure uses the ATMS as an example sensor to describe DGSS. However, it should be understood that DGSS is applicable regardless of the sensor or scanning mechanism.

The imaging aperture of a cross-track sensor 310, such as the ATMS, may be scanned in a swarth perpendicular to the direction of travel of the satellite 305. Scanning may be performed by a rotating reflector that directs microwave radiation to the sensor 310. For the ATMS, the reflector completes on revolution every $2\frac{2}{3}$ seconds, of which 2 seconds is the actual measurement time across the entire scanning angle, and ⅔ second is used for calibration and to slew back to the scan start angle.

The NOAA-20 satellite is currently ~ 834.7 km above the Earth at apogee. As shown in FIG. 3, with a scan angle of -52.7° to +52.7°, the pixel-center to pixel-center scan length (swarth) $S_l$ = 2191 km. For simplicity, this disclosure uses the planar model of the Earth (right triangle solution) for modeling the measurement swarth, which provides adequate accuracy. More sophisticated models that treat the Earth's surface as spherical can be applied as desired.

FIG. 3 also illustrates that the IFOV of the sensor 310 (e.g., the ATMS) may have a half angle field of view (FOV) of 2.6° for measurements in the 23.8 and 31.4 GHz bands (i.e., channels 1 and 2). The IFOV of the sensor 310 (e.g., the ATMS), however, may vary as a function of measurement band. It may have a half angle field of view (FOV) of 1.1° for measurements at 50.3-165.5 GHz (corresponding to channels 3-16), and 0.55° for measurements at 183.3 GHz (corresponding to channels 17-22).

FIG. 3 further illustrates multiple instances of a pixel 320, during a single cross-track scan (e.g., during a single revolution of a rotating reflector of the sensor 310), that form a scan line. As shown, at 23.8 GHz (channel 1), the pixel 320 at nadir may have a diameter of ~76 km. As the pixel 320 moves to the edges of the scan, the pixel 320 may become larger and elliptical. At ends of the scan line, the pixel 320 may have major|minor diameters of 207|125 km respectively, where the minor axis is in the direction of travel of the satellite 305 and the major axis is in the scan direction.

With a period of 101.4 minutes for a single orbit around the earth's circumference of 40,075 km, the velocity of the IFOV at nadir in the direction of satellite travel $SAT_v$ is -6.6 km/sec. And, with $2\frac{2}{3}$ seconds between scan lines ($T_{scan}$), the distance between scan lines in the direction of satellite motion $S_d$ is thus 17.6 km. With a pixel-center to pixel-center scan length $S_l$ of 2191 km covered in 2 sec, the average ground scan velocity $SCAN_v$ is 1096 km/sec. The rotation of the sensor's reflector during the measurement interval may be, or assumed to be, constant at a constant angular rate of 0.92 rad/sec. This translates to an instantaneous ground scan velocity that changes across the IFOV (fast at the edges and slowest in the center). The average scan velocity (with respect to the pixel center) may be computed as the swarth length divided by the measurement time (e.g., 2191 km/2 sec).

A DGSS system 100 may use these instrument and orbital parameters to calculate an active window (e.g., a time-dependent, geo-fenced area) for protecting satellite sensor measurements from, e.g., 5G communications. Similar parameters may exist for various sensors (e.g., radiometers), although the ground pattern for conical scanning radiometers is considered to be more complicated than that of cross-track scanning radiometers like sensor 310.

There are currently 35 microwave radiometers listed in the World Meteorological Organization database that use the 23.60-24.00 GHz band for measurements. A DGSS system 100 in accordance with aspects of this disclosure may account for any number of satellite sensors (e.g., radiometers). For purposes of protecting measurements for weather forecasts, it may be that the DGSS system 100 accounts for only one or a few sensors. For example, in some embodiments, the DGSS system 100 might only account for three satellite sensors: one that scans the Earth in the early morning, one that scans the Earth in the late morning, and one that scans the Earth in the early afternoon (all times referenced to the Equatorial Crossing Time (ECT)). The DGSS system 100 may be configured so that the number of satellite sensors it accounts for may be changed. In other words, the DGSS system 100 is adaptable so that it can be readily modified to account for new satellite sensors as they are deployed. The number of satellites used to support weather forecasting and other EESS may be important, as network availability for a 5G network using DGSS may be inversely proportional to the number of satellites being protected from 5G transmissions.

FIG. 4 illustrates an example data structure for DGSS. More specifically, FIG. 4 provides a table of instrument and satellite parameters for a few of the 23.8 GHz sensors (e.g., radiometers). In some embodiments, a DGSS system 100 may be configured to receive one or more of these parameters from a ground station 125 or another source (e.g., from, via the Internet or a private network, a server operated by a government entity or contractor). The DGSS system 100 may also calculate one or more of these parameters based upon other parameters as demonstrated herein. For example, the DGSS system may be configured to calculate the pixel size at nadir and/or at an end of a scan. As another example, the DGSS system 100 may calculate the swarth length and dwell time. Moreover, the DGSS system 100 may determine a size (width and length) of the active window 121, as explained further herein. The DGSS system 100 may store the parameters received and those calculated in one or more databases for later use in modifying the transmission characteristics or traffic of a telecommunications network (e.g., 5G network).

In some embodiments, pixel size, swarth length, scan time, and/or orbital period may be used to determine which network antennas (e.g., 5G network antennas) are within an area subtended by the IFOV or a scan line (depending on a form of geo-fencing being applied) of a satellite sensor at a specific time (e.g., current time or future time). Further, in some DGSS embodiments, a guard band (e.g., geographical guard band) may be implemented to account for uncertainties in determining the IFOV, and therefore, uncertainties in geolocating the pixel or a scan line. Accordingly, DGSS may entail determining an "active window" - the area within the pixel or scan line plus a guard band. The area and time spent for the measurement sensor to cover the active window ($T_{dwell}$) is the area and time over which DGSS implementations may modify transmission characteristics or traffic of a communications network (e.g., 5G network) to comply with necessary out of band emissions limits.

Multiple different geo-fencing techniques may be utilized in various DGSS implementations. Two example geo-fencing techniques are: scan line geo-fencing (in which the active (e.g., current) measurement scan line plus additional guard band scan lines are used for geo-fencing), and pixel geo-fencing (in which the active (e.g., current) measurement pixel plus surrounding pixels are used for geo-fencing).

In some embodiments, a single DGSS system may use multiple geo-fencing techniques. For example, a scan line geo-fencing technique may be used for one satellite sensor (e.g., a satellite sensor whose IFOV may be difficult to determine reliably), while a pixel geo-fencing technique may be used for another satellite sensor (e.g., a satellite sensor whose IFOV may be reliably determined).

Whether to use scan line geo-fencing or pixel geo-fencing may be determined based on simulations of a DGSS system. Where simulation results indicate that out of band emissions are unlikely to corrupt satellite sensor measurements, pixel geo-fencing may be used to minimize the impact on the communications network (e.g., 5G network). Network administrators may consider various trade-offs in determining which geo-fencing technique to use. Scan line geo-fencing may be easier to implement than pixel geo-fencing because pixel geo-fencing may involve rapidly changing a communication network's traffic and transmission characteristics (e.g., ~ 30 msec for ATMS) and because pixel geo-fencing depends on accurately determining a sensor's IFOV. Accurately determining a sensor's IFOV may require accurately knowing the relationship between the scan position and satellite position which may be difficult due to phase drift between scan angle position of the sensor (e.g., a radiometer's reflector) and the orbital position of the satellite. On the other hand, scan line geo-fencing may have a more negative impact on a communications network (e.g., 5G network) than pixel geo-fencing because scan line geo-fencing may have a larger active window.

FIG. 5 illustrates an example active window 521 (see dotted box) for DGSS. In this example, the active window 521 is determined according to a scan line geo-fencing technique. More specifically, FIG. 5 provides an example of a DGSS active window for a radiometer with a maximum pixel size of 60 km, and a distance between scan lines of 30 km. In this example, 5 scan lines (2 above and 2 below the active scan line) are used to achieve a guard band of 1 pixel (e.g., 60 km) on either side of the active scan line. While FIG. 5 enlarges the +1 and +2 scan lines to improve visibility, it should be understood that these scan lines may be the same size as the active scan line. Moreover, it should also be understood that -1 and -2 scan lines above the active scan line also exist and form part of the active window 521. In addition, although the scan lines are shown as having a rectangular shape, the scan lines (and therefore the active window 521) may have an hour glass shape in which the middle is narrower than the ends due to the pixel at nadir being smaller than the size of the pixel at ends of the scan. Other active scan line shapes are also possible including a circular scan line for conical scanners where the center of the circle is at the satellite nadir There may be multiple sources of uncertainty with respect to predicting the geo-location of a measurement scan line based on the nadir position of the EESS satellite. A DGSS system 100 may be configured to account for one or more of such sources. In particular, the DGSS system 100 may be configured to account for three sources of uncertainty. The first may be the accuracy of the center of the scan line due to the uncertainty in the satellite's location. The second may be the sensor's pointing error (e.g., orientation of the sensor with respect to the satellite). The third may be uncertainty in the timing or position of the scan (e.g., position of the scanning reflector for the ATMS). In other words, the point at which the sensor is within its path of scanning (e.g., where along its revolution for the ATMS) may be uncertain. For example, it may be uncertain whether the sensor is at the end of the scan line in a cross-track scan or at the middle of the scan line.

With respect to the first and second sources of uncertainty, studies of pixel geo-location accuracy based on observation of ground features (land to water boundaries, since these are clearly measurable because of the change in surface emissivity) show a geo-location accuracy of $\leq P_d/2$ where $P_d$ is the maximum pixel diameter in the direction of the satellite's orbit (i.e., at the edge of a scan line). This is consistent with the spatial resolution predicted by Shannon/Nyquist, since the sampling spatial frequency — equal to the inverse of the distance between scan lines — is typically $\leq P_d/2$ for sensors, such as microwave sounders.

The third source of uncertainty (e.g., whether the measurement pixel is at the beginning, middle, or end of the scan line) contributes an uncertainty of $\pm P_d/2$ if the center of the scan line is assumed to be at the nadir position. The full uncertainty is thus $\pm P_d$, or one pixel above and one pixel below the active scan line. In some embodiments, this analysis may overestimate the uncertainty in geo-location of the scan line. The scan line geolocation in the direction of satellite motion may be more accurate than a pixel's geolocation accuracy, as the scan line geolocation may be independent of the scanning mechanism and only dependent the sensor pointing error and/or satellite location error (~ meters). Moreover, in some DGSS implementations, the DGSS logic 101 may recover the scan "clock" indicating the relationship between satellite position and scan line position from the existing data channel between the ground station and the sensor (e.g., radiometer) and/or satellite.

With $S_d$ as the distance between scan lines and $G_b$ as the width of the guard band, the number of scans N by which the active scan line is geo-fenced using a guard band $G_b$ above and below the active scan line may be determined as follows:

$$N = 1 + 2\, ceiling\left\{\frac{G_b}{S_d}\right\}$$

In this case, the width w of the DGSS active window may be determined as follows:

$$w = N S_d + P_d$$

Per the discussion above, DGSS implementations may use $G_b = P_d$ to define the active window for scan line geo-fencing. The area of the DGSS active window may be determined as $(N\, S_d + P_d)S_l$ and the total time required for the active window to pass over any point on the ground may be determined as $(N + 1)\, T_{scan}$. FIG. 3 shows an example where the guard band is equal to 1 pixel, and the distance between scans is ½ a pixel.

In some DGSS embodiments, the sensor 110 may be the ATMS, where $P_d = 125$ km (the maximum pixel width in the direction of satellite motion), $T_{scan} = 2\frac{2}{3}$ sec, $S_d = 17.6$ km, and $N = 17$. In such embodiments, the DGSS active window may be 425 km wide (slightly larger than 3 times the maximum pixel width in the direction of satellite travel), and the total time required for the DGSS active window to pass over any point on the ground may be 48 seconds. DGSS logic 101 may be configured to make these computations and update the appropriate database(s) accordingly. This is reflected in the table in FIG. 4, which includes data for N, $S_d$, $S_l$, and the total time required for the DGSS active window to pass over any point on the ground, for several known 23.8 GHz radiometers (e.g., ATMS, AMSU-A, SSMIS, MWRI).

Figure 6:
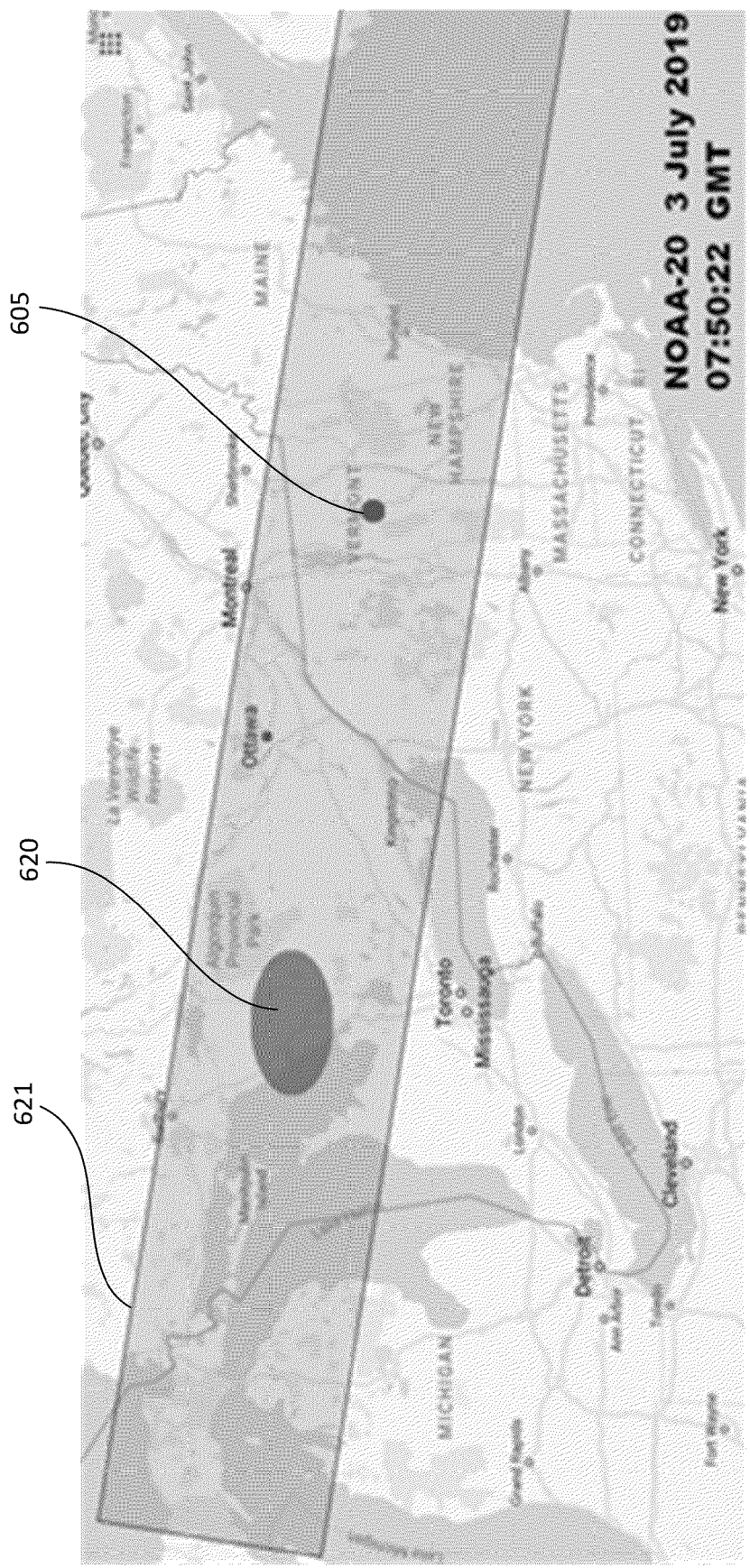
FIG. 6 illustrates an example active window in accordance with aspects of this disclosure.

FIG. 6 shows an ATMS pass across the Eastern United States in early July, 2019 with an example DGSS active window 621 for implementing a scan line geo-fence. More specifically, FIG. 6 shows one frame from a simulation of the DGSS active window 621 with the parameters above for a scan line geofenced ATMS pass across the Eastern United States. The larger spot illustrates the active measurement pixel 620 (corresponding to the IFOV of the ATMS) at a particular time (e.g., 07:50:22 GMT on 3 Jul. 2019), and the smaller dot illustrates the location of the NOAA-20 satellite 605 carrying the ATMS at that same time. It should be understood that FIG. 6 is designed to illustrate some aspects of this disclosure and not necessarily depicting an actual pixel, which would, in some embodiments, be tilted to line up with the tilt of the scan line or tilt of the active window 621.

Figure 7:
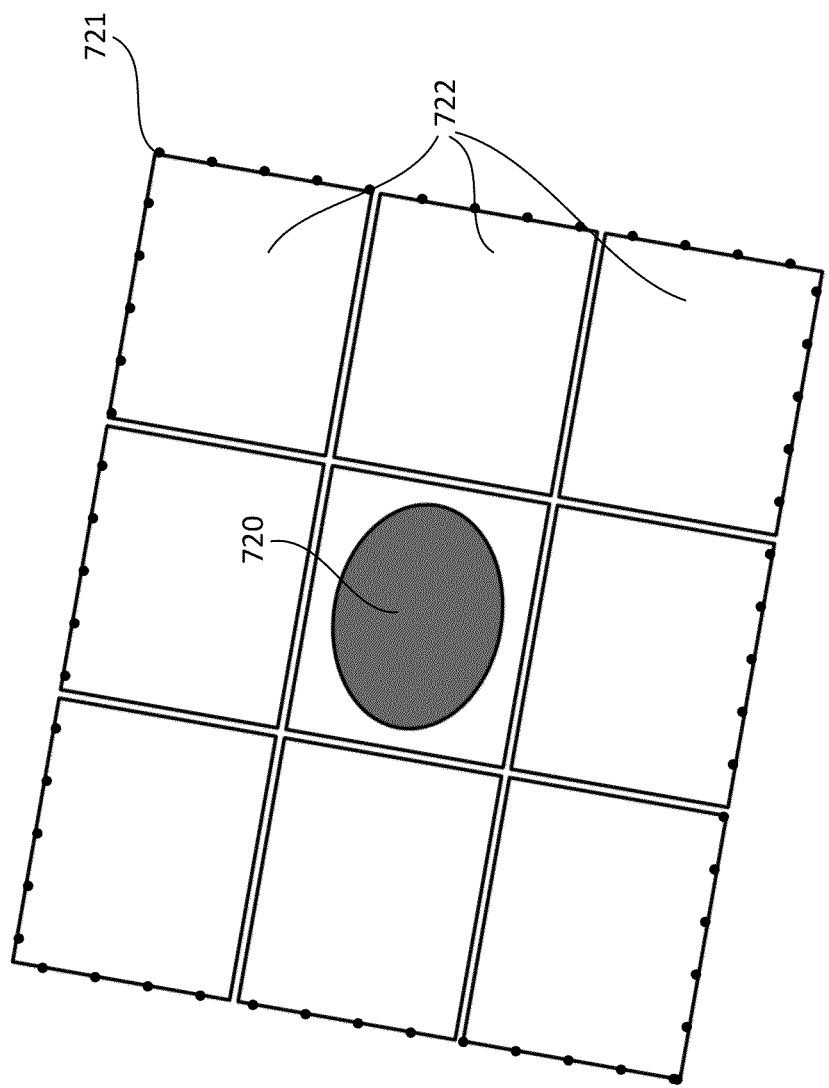
FIG. 7 illustrates an example active window in accordance with aspects of this disclosure.

FIG. 7 illustrates an example active window 721 (see dotted box) for DGSS. In this example, the active window 721 is determined according to a pixel geo-fencing technique. In this example, guard bands 722 of approximately 1 pixel on all sides of the active pixel 720 may be used as the active window. While FIG. 7 shows the guard bands 722 as slightly larger than the pixel 720, it should be understood that the guard bands 722 may tightly fit the pixel 720. Moreover, although the guard bands 722 are shown as having a square shape, the guard bands 722 (and therefore the active window 721) may have different shapes in some embodiments. Also, the shape and size of each guard band does not have to be the same. In some embodiments, the active window 721 may track the shape of the active pixel 720. For example, where the active pixel 720 is circular at nadir, the active window 721 may be circular; and where the active pixel 720 is elliptical, the active window 721 may be elliptical.

Rather than geo-fencing an entire scan line, pixel based geo-fencing creates a moving window around the active measurement pixel 720 with a guard band the extends in both the scanned direction and the direction of satellite movement. While pixel based geo-fencing reduces the active window size and dwell time, it may be harder to implement due to much higher required timing accuracy. For example, in the case of ATMS, a guard band of ±1 pixel on either side of the measured spot, would result in a 27.4 msec DGSS active window dwell time, which in turn may require timing accuracy of ~ 3 msec (which translates to a pixel location accuracy along the scan line within about 2.5 km). Because the active window dwell time may be relatively small and network response times might not be fast enough to meaningfully respond, the DGSS system may begin implementing network modifications prior to the active window time in order to account for network inertia against some reconfigurations. In some embodiments, the DGSS system may determine an estimated time (e.g., average time) for particular elements of the network to respond to network modification instructions, and the estimate may be used for the timing for transmitting actual modification instructions. Moreover, in some embodiments, the DGSS system may determine the time a particular base station or UE will react based on real time information about the network (e.g., how many UEs are connected to the particular base station, antenna parameters, etc.). The DGSS system may also determine the time a particular base station or UE will react based on actual test results (e.g., results may indicate that reaction times are slower where network congestion is higher, such as urban areas, than where network congestion is lower, such as rural areas). In some implementations, the DGSS system may include machine learning techniques to determine the time it takes particular network elements to react to instructions to make network modifications (e.g., modifications to transmission characteristics or traffic).

Figure 8:
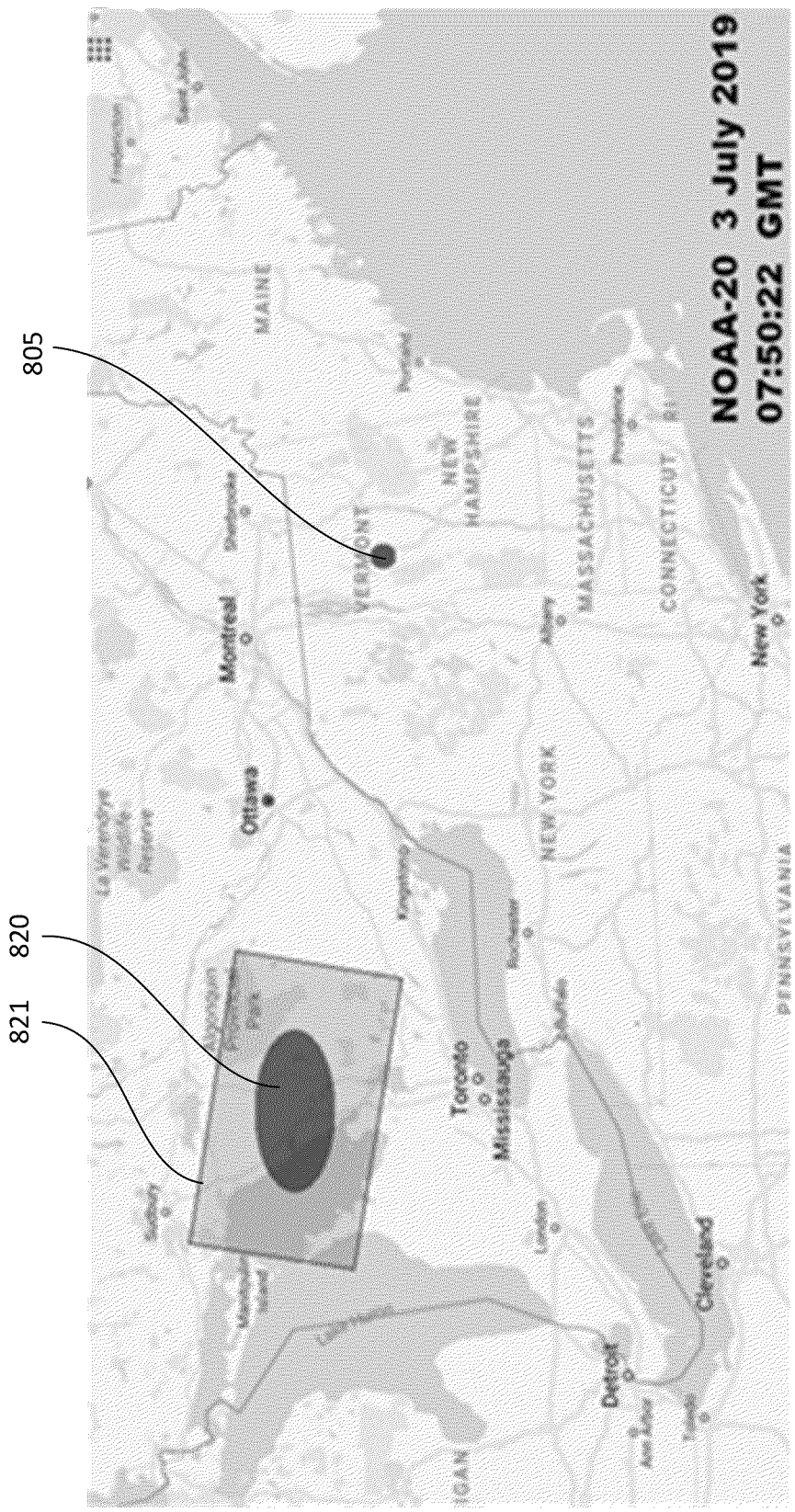
FIG. 8 illustrates an example active window in accordance with aspects of this disclosure.

FIG. 8 shows an ATMS pass across the Eastern United States in early July, 2019 with an example DGSS active window 821 for implementing a pixel-based geo-fence. More specifically, FIG. 8 shows one frame from a simulation of the DGSS active window 821 for a pixel-based geo-fenced ATMS pass across the Eastern United States. The larger spot illustrates the active measurement pixel 820 (corresponding to the IFOV of the ATMS) at a particular time (e.g., 07:50:22 GMT on 3 Jul. 2019), and the smaller dot illustrates the location of the NOAA-20 satellite 805 carrying the ATMS at that same time. It should be understood that FIG. 8 is designed to illustrate some aspects of this disclosure and not necessarily depicting an actual pixel, which would, in some embodiments, be tilted to line up with the tilt of the active window 821.

Using the active window dwell time for scan line geo-fencing, it is possible to estimate the worst-case network availability - which is when all transmissions during $T_{dwell}$ cease. The worst-case analysis is interesting for pedagogical reasons, but it may be unrealistic for two reasons. First, the transmission power for all antennas within the DGSS active window would likely never be reduced to zero. For example, at worst, the DGSS logic 101 might cause the power to be reduced to the power level necessary to comply with an out of band emissions limit, rather than set the transmission power to zero. Second, as disclosed herein, realistic deployment architectures and optimization strategies for dealing with various network issues (e.g., network congestion) may be leveraged such that subscriber access can remain greater than 99.99% during an active DGSS session (i.e., when the active window coincides with the network).

To compute a worst-case analysis in the total water vapor column (e.g., 22-24 GHz) observation band, the DGSS system 100 (e.g., DGSS logic 101), or a computing device for monitoring or evaluating DGSS, may be configured to make several assumptions. First, it may assume that all network transmissions (e.g., 5G transmissions) go to zero during $T_{dwell}$. Second, it may assume that weather modeling algorithms use water vapor measurements from early morning, mid-morning, and afternoon (ECT) sensor-equipped satellites (e.g., SSIMS(DMSP 5D-3 F18), AMSU- A(METOP-C), and ATMS (NOAA-20)). Third, it may assume that each satellite makes 2 passes per day over any given point (and therefore over any particular antenna). Fourth, it may disregard a satellite and/or sensor with a measurement band that is centered at a frequency equal to or below a predetermined threshold (e.g., 22.2 GHz), such as, e.g., SSMIS(DMSP 5D-3 F18) having a measurement band centered at 22.2 GHz.

As an example where the worst case analysis is determined based on only the AMSU-A and the ATMS, the DGSS system 100 (e.g., DGSS logic 101), or a computing device for monitoring or evaluating DGSS, may determine the total active window dwell time as 2 × 48.0 sec (for AMSU-A) + 2 x 48.1 sec (for ATMS) and use this total active window dwell time to determine the network availability as follows:

$$NA = 1 - \frac{total T_{dwell} \, per \, day}{24 hrs * 60 \left(\frac{min}{hr}\right) * 60 \left(\frac{sec}{min}\right)} = 99.78\%$$

Having disclosed examples for determining a moving geo-fenced window, this disclosure turns to further describing how a communications network (e.g., 5G network), in a DGSS system, may modify traffic or network characteristics to achieve lower emissions goals (e.g., limits set by international standards) to avoid corrupting weather satellite data while network (e.g., base station 150) and user equipment 160 transmission antennas are in the IFOV of an EESS sensor 110 (e.g., measurement radiometer). While it is possible to reduce (or even turn off) the transmission power of these antennas while they fall within the active window (e.g., for 10-50 seconds depending on the sensor), more sophisticated algorithms that understand the type user equipment, type (e.g., class) of traffic, or user equipment signal strength, and that use both machine learning and formulaic algorithms, may be employed to significantly reduce network and subscriber impact.

This disclosure provides multiple DGSS implementation architectures, strategies, and algorithms for using IFOV and/or pixel predictions (and thus active window predictions) to modify transmission characteristics and/or traffic of a communications network (e.g., 5G network). However, it should be understood that these implementations are not exhaustive, and that other implementations may provide solutions. Aspects of this disclosure may pertain to a hybrid 4G/5G dual-radio architecture (often called dual-connect, or option 3.x by the wireless industry) for mm-wave 5G deployments, in order to describe a currently practical solution to an existing problem. This architecture is already being deployed by major carriers, and is generally considered to be the most favorable architecture for current 5G deployments. However, the concepts and algorithms discussed here (and in a deployment mode developed in detail for DGSS implementation) carry over to stand alone 5G (both dual-radio, and single radio) deployments.

Figure 9:
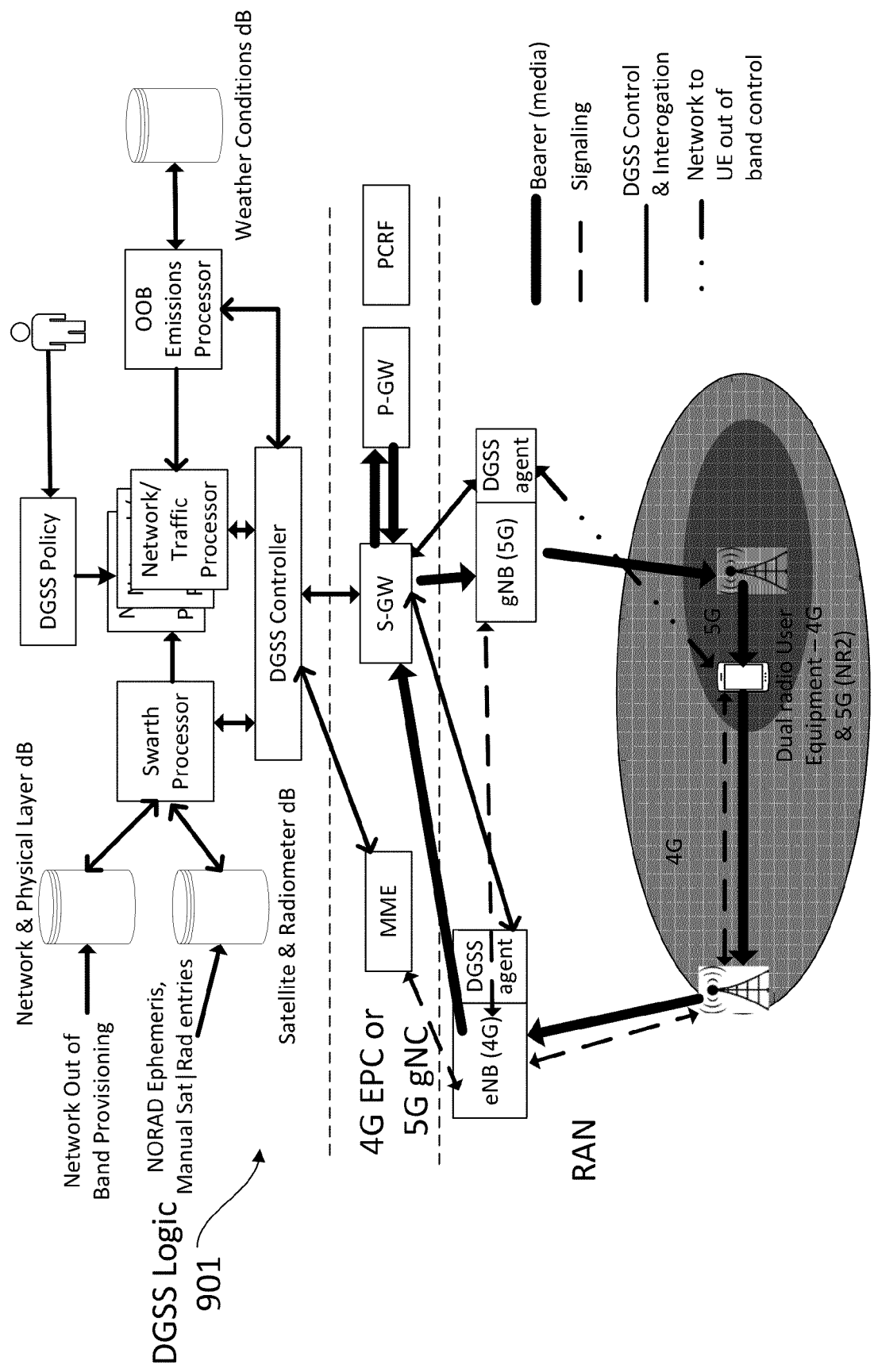
FIG. 9 illustrates an example system architecture in accordance with aspects of this disclosure.

FIG. 9 illustrates an example DGSS system architecture integrated with a hybrid 4G/5G deployment. In this example architecture, all signaling, provisioning, and uplink (subscriber to network) bearer channels are supported on 4G, and downlink (network to subscriber) bearer channels are supported on 5G. This hybrid architecture may facilitate roaming into and out of mm-wave 5G small cells, because the signaling connectivity (in the 4G network) is always maintained. This hybrid architecture may also insulate against 5G network loss due to attenuation or other issues. Because building out a mm-wave network may entail deploying between 10x and 100x the number of base stations as existing 4G networks and may entail adding substantive amounts of fiber or other backhaul facilities, and because mm-wave networks are inherently more susceptible to attenuation, it is likely that a dual-radio architecture will be prevalent for some time. The architectural evolution may be that existing 4G deployments in low and mid-band spectrum will be upgraded to 5G to support the reduced latency and higher spectral efficiency of 5G, while maintaining ease of roaming from mm-wave to low and mid-band cells. Accordingly, in some circumstances, the 4G evolved packet core (EPC) and radio access network (RAN) may move to 5G, but the salient features of the dual-band architecture as it relates to DGSS — the ability to move between bands — may continue to be supported.

FIG. 9 illustrates how an example DGSS system may be integrated with a dual-connect 4G/5G mm-wave network. FIG. 9 provides a logical architecture at the DGSS and evolved packet core layers from which numerous physical architectures should be understood. FIG. 9 illustrates the DGSS logic 901 as being a separate layer from the EPC. However, it should be understood that the DGSS logic 901 can be integrated into the EPC layer or split between a separate layer and the EPC layer.

Referring to FIG. 9, the EPC (or gNC) layer includes a serving gateway (S-GW). One of the functions of the serving gateway may be as a border router between the Radio Access Network (RAN) and the EPC (or gNC), or the RAN (including the DGSS Agent) and the DGSS Controller. In such examples, the S-GW may maintain the routing table that advertises routes to the IP addresses of user equipment, and to network equipment in the RAN; it may also facilitate bearer channel tunneling between the S-GW and gNBs (or eNBs). The S-GW also provides routing for user equipment and network equipment from the RAN to the EPC, or from the RAN to the public internet through packet data network gateways (P-GWs). The S-GW may also serve as the local mobility anchor (LMA) for eNodeB to gNodeB handover, which is used to maintain subscriber connectivity when band coverage is lost.

FIG. 9 also shows a dual-radio user equipment. As described above, user equipment may include mobile phone(s), fixed-wireless network interfaces, Internet of Things (IOT) devices, etc. There may be different IP addresses and access point names (APNs) to separate the 4G/5G bearer channels.

Further, FIG. 9 illustrates a packet data network gateway (P-GW) of the EPC. The P-GW may include the core router(s) connecting the wireless wide area data network to the public Internet, analogous to core routers of other Internet service providers.

As shown in FIG. 9, the DGSS logic 901 may include a network and physical layer database (dB). This database may include the latitude and longitude of all network transmitting gNodeB and eNodeB antennas, indexed against the fully qualified domain name (FQDN) for each eNodeB/gNodeBs.

The DGSS logic 901 may also include a satellite and radiometer database. That database may include one or more of the parameters (e.g., orbital parameters such as apogee, period, etc., and radiometer parameters such as scan time, scan angle, instantaneous field of view, etc.) used to compute active windows and impact on network availability.

FIG. 9 also illustrates a DGSS agent at each of the eNodeB and gNodeB. In some embodiments, additional application program interfaces (APIs) may be used to interface with gNB or S-GW logical elements. These APIs are depicted as DGSS agents. In addition, it may be advantageous to perform some of the network traffic processing at a local/gNG level. For example, it may be useful in some cases to increase the buffer size for some applications (e.g., video streaming) during the DGSS active window. In this case, the DGSS agent might provide out-of-band signaling to the user equipment (or to applications running on the user equipment) that would temporarily increase the buffer size (or communicate with the streaming server to temporarily increase the buffer size).

As illustrated in FIG. 9, the DGSS logic 901 receives satellite orbital predictions (usually called an ephemeris) from the North American Aerospace Defense Command (NORAD) or from a similar source. A DGSS implementation may depend on very accurate location information for EESS satellites. NORAD publishes an ephemeris (with meter scale resolution and accuracy) 3 times a week, with the predicted orbits for all current satellites that are accurate to ~ meters. Alternatively, software (such as NASA's GMAT) can be used to predict the location of all satellites of interest.

The DGSS logic 901 may also include a DGSS policy node, which may provide an interface to let a network administrator flag which satellites/which transmission bands are subject to network/traffic modifications. The policy node may also allow network administrators to assign weight-based constraints to balance the importance of the constraint used by a machine learning engine. Examples of DGSS policies are represented in Tables 2A and 2B below.

Table 2A provides satellite to channel mapping for active DGSS sessions:

TABLE 2A

| Sat NORAD ID | Chan # |
| --- | --- |
| 43013 | 1 |
| 43013 | 2 |
| 43013 | 3 |
| 43689 | 1 |
| 43689 | 3 |
| 43689 | 5 |
| 35951 | 2 |
| 35951 | 3 |
| 35951 | 6 |

Table 2B provides policies for implementing example constraints. Weights may be used by a machine learning algorithm. Example weights are shown, but are not necessarily indicative of any network or carrier preference.

TABLE 2B

| Polcy # | Weight | Constraint |
| --- | --- | --- |
| 1 | 100% | $P_{OOB}$ < Emission Limit |
| 2 | 80% | Maximize the number of mission critical UE connections to remain on mm spectrum |

TABLE 2B-continued

| Policy # | Weight | Constraint |
|---|---|---|
| 3 | 50% | Maximize number of non mission critical UEs that remain on mm spectrum |
| 4 | 35% | Move mission critical UEs to 4G |
| 5 | 10% | Move non mission critical UEs not on 5G to 4G |
| 6 | 10% | Drop non mission critical UEs that cannot move to 4G |

Still referring to FIG. 9, the DGSS logic 901 may include a DGSS controller. The DGSS controller may perform administration functions, routing, and failover mapping between DGSS logical entities and the network core (e.g., EPC) and radio access network. The DGSS controller may interrogate and control the mobility management entity (MME), which may anchor the signaling channel. The MME is a logical entity defined by 4gpp for next generation (4G and above) networks. The MME may anchor signaling between user equipment and the EPC (or gNC). For example, when a UE tries to attach to the wireless network, the MME may receive the attach request and then query the HSS (Home Subscriber Service - a database with subscriber and UE information) to authenticate and authorize the UE. Similarly, the MME may handle the setup of all UE to network sessions, such as, e.g., a bearer session that handles all best effort IP traffic, an operations and maintenance private network bearer that is used to provision and manage UEs, etc. Further, the DGSS controller may communicate with a policy and charging rules function (PCRF) entity, which may be collapsed with a database of DGSS policies. The PCRF is a logical entity defined by 3gpp for next generation (4G and above) networks that is queried before providing services to user equipment. For example, video calling may be a class of service whose definition resides in the PCRF (e.g., what bandwidth is allowed, what quality of service in terms of Quality of Class Identifier (QCI) is associated with this service, etc.). From a DGSS perspective, it may be useful to define rules related to prioritization of 5G related services using the syntax or protocols used in the PCRF.

The DGSS logic 901 may further include a swarth processor (SP). The SP may, by processing software (e.g., computer-executable instructions), generate the traffic/network start and stop times for each gNodeB based on the satellite/band selections set via the policy node and stored in a policy database, the latitude and longitude of the transmitting antenna(s) stored in the network and physical layer database, and the satellite and radiometer parameters stored in the satellite and radiometer database. The swarth processor may output information representing or defining the DGSS active window (e.g., a DGSS active window table). This output may be input to one or more network & traffic processors which are responsible for modifying network and traffic characteristics at the gNodeB level to reduce out of band emissions while maintaining network availability. An example of the swarth table indexed into satellite/radiometer tables and network tables is given below in Table 3:

The swarth table in Table 3 shows the active DGSS windows (in Unix Epoch Time) for a specific antenna location (#1001 maps to a latitude of 38.952470, and longitude of -77.079001) for DGSS active window sessions on Aug. 8, 2019. The swarth process has identified six windows corresponding to two passes of each of three satellites. Two of the instruments (#6 = ATMS, and #2 = AMSU-A) measure at Channel 1 = 23.8 GHz. Instrument #21 (SSMIS) measures at Channel 0 = 22.8 GHz. To read a full session for example, the last window is for antenna location 1001, for satellite with NORAD ID 43689 (METOP-C), instrument 2 (AMSU-A), channel 1 (23.8 GHz), starting at UNIX Epoch Time 1565316708 (Friday, Aug. 9, 2019 02:11:48 GMT), and ending at 1565316756 (Friday, Aug. 9, 2019 02:12:36). The FQDN is for the gNodeB (or the DGSS Agent running on the gNodeB) handling the channel 1 frequency range at antenna location 1001 (Real FQDNs are not provided as they are proprietary carrier information).

Figure 12:
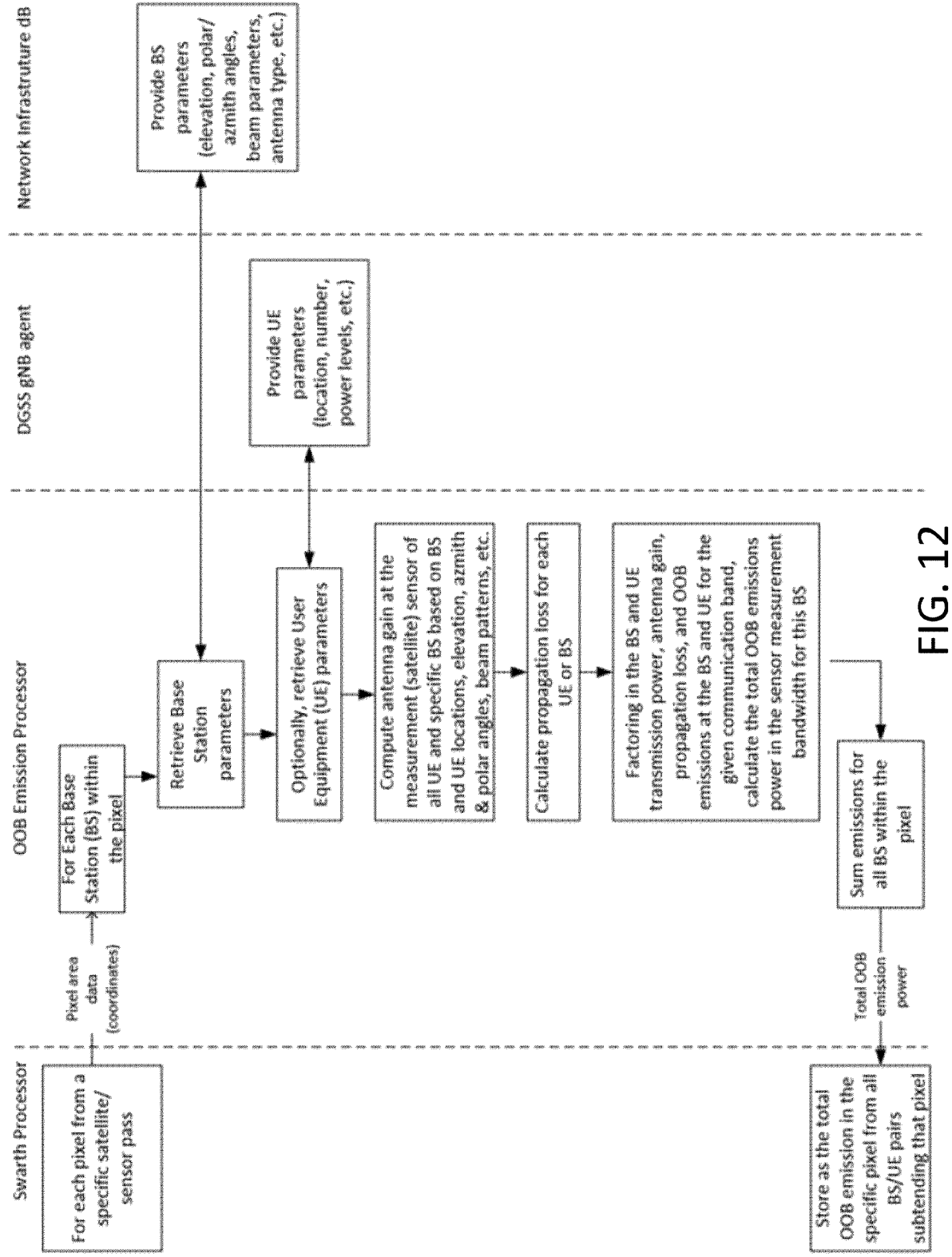
FIG. 12 is a flow chart showing an example process in accordance with aspects of this disclosure.

DGSS logic 901 may also include an out of band (OOB) emissions processor. The OOB emissions processor, may execute software, to calculate the OOB emissions from a given network configuration. This process may be used by the network and traffic processor(s) (NTP(s)) to validate the constraint that a given network configuration for the active DGSS window complies with one or more OOB emissions limits (e.g., policy #1 in Table 2B). An example process that may be performed by the OOB emissions processor is illustrated in FIG. 12, which is discussed in further detail below. In some cases, if the calculated OOB emissions comply with an OOB emission limit, the DGSS might not take any action to restrict the network.

In some embodiments, the OOB emissions processor may be connected to a weather conditions database. The weather conditions database may store information regarding current weather conditions (e.g., weather conditions based on most recent data) for one or more geographical areas. The weather conditions database may acquire information regarding current weather conditions from one or more data feeds from various sources (e.g., third party weather data providers or DGSS system sensors such as temperature or pressure sensors, which may be collocated with base stations). The OOB emissions processor may query the weather conditions database for a portion of this information (e.g., current weather data for a location within a particular pixel or active window). Alternatively, the OOB emissions processor may receive, from the weather conditions database, a feed that provides current weather condition information for an area that is currently being scanned by a particular satellite measurement sensor (e.g., radiometer). That is, the weather conditions database may receive, store, and/or provide a feed that synchronizes current weather condition information with the IFOV of a particular satellite measurement sensor (and therefore with the measurement data of that satellite sensor). Although FIG. 9 illustrates a single weather conditions database, it should be understood that the OOB processor may receive weather information from

TABLE 3

| Ant. Loc. Index | NORAD ID | FQDN | Inst # | Chan # | Start Time [UNIX Epoch] | Stop [UNIX Epoch] |
|---|---|---|---|---|---|---|
| 1001 | 43013 | FQDN1 | 6 | 1 | 1565242500 | 1565242553 |
| 1001 | 43013 | FQDN1 | 6 | 1 | 1565248573 | 1565248626 |
| 1001 | 35951 | FQDN2 | 21 | 0 | 1565253291 | 1565255091 |
| 1001 | 35951 | FQDN2 | 21 | 0 | 1565259360 | 1565261220 |
| 1001 | 43689 | FQDN1 | 2 | 1 | 1565310120 | 1565310168 |
| 1001 | 43689 | FQDN1 | 2 | 1 | 1565316708 | 1565316756 | multiple sources and weather conditions databases that provide current weather information for different localities.

In some cases (e.g., depending on the frequency band of the satellite measurement sensor), when calculating the OOB emission power that might affect that sensor (e.g., radiometer), the OOB emission processor may account for attenuation due to atmospheric gases (e.g., water vapor). The attenuation may be determined as a function of pressure, temperature, and/or water vapor density. The OOB emissions processor may therefore acquire values of these parameters for a particular measurement pixel. The values of these parameters (e.g., pressure, temperature, and water vapor density) may be measured by sensors at surface elevations (e.g., in the troposphere) and stored in the weather conditions database. For example, the weather conditions database may receive the values of these parameters from available local meteorological measurements. The values may be time and/or location stamped so that the OOB emissions processor may use only those values corresponding to a certain pixel or active window. Using these weather condition values, the DGSS system (e.g., OOB emission processor) may correct OOB emission calculations to account for atmospheric absorption (or emission) of energy.

FIG. 9 also shows that DGSS logic 901 may include one or more network & traffic processors (NTPs). An NTP may, e.g., by executing software, generate signals to effect the actions that will reduce the aggregate transmission power across all gNodeBs in the active window below an amount (or threshold) for complying with emission limits. The NTP(s) may provide the intelligent component that modifies bearer traffic to minimize impact to the subscriber.

Figure 10:
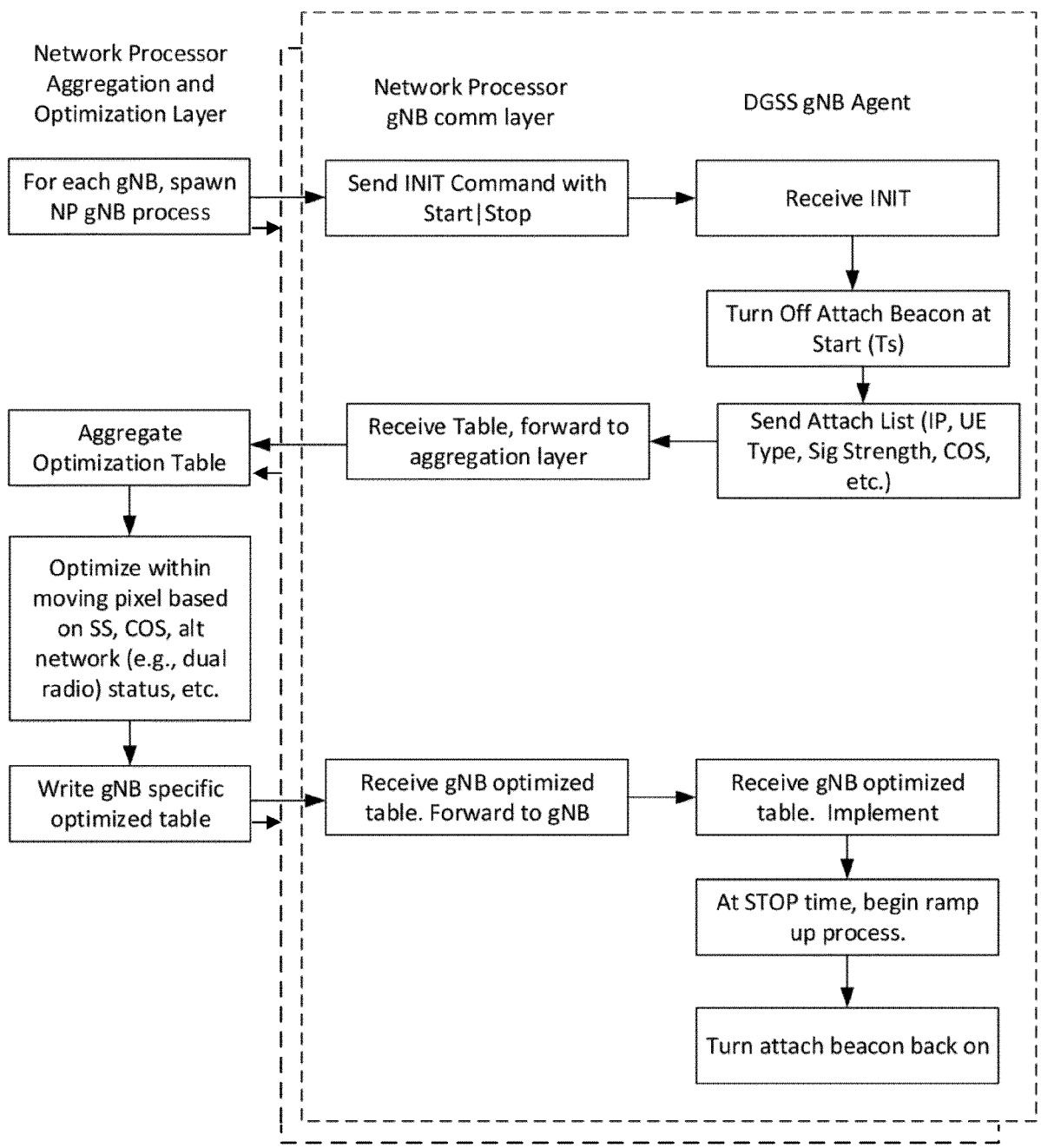
FIG. 10 is a flow chart showing an example process in accordance with aspects of this disclosure.

FIG. 10 provides a flow chart for one example process of a network & traffic processor (NTP) based on the system architecture in FIG. 9. The NTP may queue DGSS sessions provided to it by the swarth processor (SP) and trigger on a given session prior to activation. The process may start by spawning J processes or threads (where J = the number of gNBs inside the DGSS activation window). The J processes may be performed in parallel. Each process may be responsible for notifying the DGSS agent of an impending DGSS activation, collecting the number of user equipment devices connected to the base station (e.g., gNB) along with the characteristics of the UE ⇔ base station communications channel (e.g., Internet Protocol (IP), signal strength (SS), UE type, class of service (COS), etc.), and sending that data to the NTP aggregation and optimization layer. Once data for all communication sessions has been aggregated, the NTP may optimize the overall network connectivity based on policy rules by proposing how to modify (or not) each communication session. The proposed modifications may be sent back to the appropriate base station (e.g., gNB) which may in turn enact the modifications during the active window, and then restore all communication sessions to their default condition after the DGSS active window for that base station (e.g., gNB) is completed (e.g., has passed). For some implementations (e.g., 5G implementations), SOAP over http and/or JSON protocols may be used to instruct base stations (e.g., gNBs) to enact the modifications. Some additional details may include turning off the attach capability prior to the DGSS active window or prior to sending a signal (e.g., INIT request, as shown in FIG. 10) to the DGSS agent (e.g., a base station API) with modification instructions, or ramping the communications sessions back to default status after the DGSS active window is over to avoid stressing the signaling channel.

In some embodiments, the NTP may include an optimizer, which takes the aggregated connections table and generates a dispositions table that provides a suggested state of each communications session for optimizing the overall 5G network within the DGSS active window. Various optimization algorithms may be implemented in DGSS systems. In some examples, a mechanism for optimization may be implanted as a machine learning process.

It should be understood that the determinations regarding network modifications made by the NTP may be based on out of band (OOB) emissions calculations. One aspect of the DGSS system is that it may calculate OOB emissions on a per pixel (or per active window) basis. This allows the DGSS system to enable network modifications and/or allow for adjustments to potentially corrupted satellite sensor (e.g., radiometer) data. The DGSS system (e.g., an OOB emissions processor) may calculate the power measured (or received) by a satellite sensor (e.g., radiometer) from one transmitter (e.g., either a base station or user equipment) according to Equation 1 below (known as the "Frilis Equation"):

$$P_R = P_E \left(\frac{\lambda}{4\pi R}\right)^2 A_E(\theta_E, \phi_E) A_R(\theta_R, \phi_R)$$

In Equation 1, $P_R$ is the received power and $P_E$ is the total transmitted power of either a base station or user equipment. Further, $A_E(\theta_E, \phi_E)$ is the transmitter's antenna gain relative to an isotropic transmitter as seen at the satellite sensor (e.g., radiometer), and $A_R(\theta_R, \phi_R)$ is the receiver's antenna gain similarly accounting for its directionality. Notably, in some cases, the direction of maximum transmitted power between a base station and user equipment might not be a straight line between the BS and UE, but may be a reflected path.

Equation 1 for the calculated power received by the satellite's sensor (e.g., radiometer) accounts for both the $\frac{1}{R^2}$ fall off due to distance, and the gain from a phased-array (e.g., a multiple input multiple output (MIMO)) antenna. It does not account for any loss due to: the attenuation caused by absorption from atmospheric gases ($L_{gas}$) echoes from objects such as buildings, trees, the ground etc. (typically called clutter in radar applications ($L_{clutter}$)), and polarization mis-match ($L_{polar}$). While the efficiency for current to radiated power is formally built into the definition of antenna gain, in practical use the electrical efficiency is often separated from the antenna gain; in which case a separate term for electrical power lost due to impedance or ohmic mismatch for both the transmission antenna ($L_{E\text{-}electric}$) and the sensor antenna ($L_{R\text{-}electric}$) may also be included in the calculation of $P_R$. Taking these factors into account, the received electrical power by the satellite sensor (e.g., radiometer) is given by Equation 2 below:

$$P_R = P_E \left(\frac{\lambda}{4\pi R}\right)^2 A_E(\theta_E, \phi_E) A_R(\theta_R, \phi_R)$$
$$L_{gas} L_{clutter} L_{polar} L_{E\text{-}electric} L_{R\text{-}electric}$$

Notably, for the measurement of OOB emissions, the beam pattern $A_E$ used may be at the wavelength (or frequency) of the satellite's measurement sensor, rather than at the communication's transmission wavelength (or frequency). For this reason, in some implementations, $A_E$ may be written as $AE(\theta_E, \phi_E, \lambda_R)$ and $A_r$ may be written as $A_R(\theta_R, \phi_R, \lambda_R)$. In some embodiments, the published ITU recommendations for $A_E(\theta_E, \phi_E, \lambda_R)$ may be used. In other embodiments, $A_E(\theta_E, \phi_E, \lambda_R)$ may be obtained from measurements for the specific type of antenna deployed by a carrier or in subscriber user equipment, wherein such measurements may be stored in antenna profiles in an infrastructure database. In any event, the received electrical power from a single transmitting entity (e.g., a base station or user equipment) can thus be calculated according to Equation 3 below:

$$P_R = P_E \left(\frac{\lambda}{4\pi R}\right)^2 A_E(\theta_E, \phi_E, \lambda_R) A_R(\theta_R, \phi_R, \lambda_R)$$
$$L_{gas} L_{clutter} L_{polar} L_{E-electric} L_{R-electric}$$

The total OOB emissions from all base stations and user equipment inside any given pixel (or active window) may be calculated by summing the OOB emission contributions from each BS and UE within the pixel (or active window) using Equation 3. This is further discussed below.

If P is the total OOB emissions power in the DGSS active window at time t, it must be equal to the sum of the OOB emissions from all base stations (e.g., gNodeBs) and all UEs located within the DGSS active window at time t. For 5G networks, communications are time domain multiplexed, so that for any given base station (e.g., gNB) at time t, the base station is transmitting to connected UEs or connected UEs are transmitting to that specific base station, but both the base station and connected UE are not transmitting to each other at the same time. In that case P may be determined by:

$$P(t) = \sum_{j=1}^{N_e} gNB_j(t) + \sum_{j=1}^{N_e} \sum_{i=1}^{N_u} UE_{j,i}(t)$$

where $gNB_j(t)$ is the OOB emissions power from the $j^{th}$ gNB in the active window (which may be calculated using Equation 3 above), $N_e$ is the total number of gNBs in the active area, $UE_{j,i}(t)$ is the OOB emissions power from the $i^{th}$ UE connected to the $j^{th}$ gNB, and $N_u$ is the number of UEs connected to the $j^{th}$ gNB. Since $UE_{j,i}(t)$ and $gNB_j(t)$ cannot both be transmitting at the same time to each other and the circuitry connected to the measuring sensor typically integrates the measurements over some period of time, the optimization algorithm will make the time averaged total OOB emission $\overline{P(t)}$ less than the maximum OOB emissions limit by moving some sessions to the alternate radio band, leaving some connections unchanged, potentially reducing the transmission power of $gNB_j$ in cases where the signal strength to the remaining $UE_{j,t}$ is high enough to maintain the requisite carrier-to-noise level, and dropping some connections that are not currently using bandwidth (or using very small amounts of bandwidth). For example, if a given UE requires a critical service (e.g., in the case of a self-driving car) that connection should be given preference (e.g., prioritized) to stay on 5G as part of the overall optimization. In another example, if another connection is a fixed-wireless connection with a strong signal, that connection could be maintained with an overall reduction in transmission power, and thus it might be beneficial to maintain this connection while letting a similar connection with poor signal strength roll over to the alternate band. These examples of service policies may be implemented using machine learning technologies.

A DGSS system does not have to modify transmission and traffic in a communications network (e.g., 5G network), and indeed, advantages may be realized even when it does not. A DGSS system may provide a benefit by determining whether (and even when and/or where) out of band emissions of a communications network (e.g., 5G, 4G/5G hybrid, etc.) exceed a threshold or limit. A DGSS system may use actual network deployment parameters (e.g., where the base station antennas are, their elevation and pointing direction, what the antenna patterns of base station and UEs are, how many UEs are connected to a particular base station, etc.) to accurately calculate (e.g., using Equation 3 above) the OOB emission power that will be measured by sensors (e.g., radiometers that measure water vapor and/or ice at mm-wave frequencies) in any pixel. In some embodiments, the DGSS system may be configured (e.g., programmed with software) to query the EPC layer, and in particular the S-GW, to obtain these actual network deployment parameters. For example, the DGSS system may interface with an API of the network to access such network deployment parameters. In some networks, the base stations and/or S-GW might not be equipped with such an API, in which case the DGSS agent may provide an API for the DGSS logic to query for obtaining these parameters for use in the actual OOB emissions calculation. Being able to calculate the actual OOB emissions (rather than simulate OOB emissions using a Monte Carlo mechanism based on numerous assumptions per the existing ITU recommendations) enables a number of actions.

A DGSS system that calculates actual OOB emissions may provide feedback, indicating what the OOB emissions are (or will be) for a particular area, to the network providers (e.g., carriers) and/or to interested government agencies (e.g., NOAA) as mm-wave communication systems (e.g., 5G networks) are architected (or deployed). This feedback information may be used by service providers (e.g. carriers) to design networks to avoid exceeding various OOB emission limits (or thresholds), such as those set by laws, rules, industry standards, etc. In some embodiments, the DGSS system may provide the design or output suggestions (e.g., antenna locations) for designing the network. The feedback information may also be used by service providers (e.g., carriers) to statically adjust the transmission and traffic parameters (e.g., to increase transmission power levels in sparse deployments, thereby increasing the service radius) while remaining within various OOB emission limits. Moreover, this feedback information may be used for enforcement and notification purposes by interested government agencies tasked with enforcing OOB emission limits or by other interest groups. In some embodiments, a DGSS system may output (e.g., display) or send a notification (e.g., to a government agency) indicating that an OOB limit was exceeded. In some examples, the alert may indicate the time and/or area at which the OOB limit was exceeded.

Further, a DGSS system that calculates actual OOB emissions may provide feedback indicating which pixel(s), as measured by the DGSS system for specific satellite borne sensors (e.g., radiometers) on specific passes, may be associated with measurements that may have been corrupted by OOB emissions from communications systems (e.g., mm-wave communication systems like 5G networks). For example, the DGSS system may provide feedback information indicating a specific pixel or corresponding area for which sensor measurements may have been compromised. From the specific pixel or corresponding area, the potentially corrupted sensor measurements (or corresponding analysis results, such as a water vapor profile determined based on the sensor measurements) may be identified. In some embodiments, the DGSS system itself may determine the corresponding sensor measurements or analytical results. Also, in some embodiments, the DGSS system may provide the feedback information (e.g., pixel or area information) to the climate community (including, e.g., private entities, government agencies, and/or various interest groups that may be interested in or engaging in weather forecasting or longer-term climate analysis). Based upon the feedback information from the DGSS system, additional systems (e.g., servers of the climate community), or additional components integrated into the DGSS system, may employ various options for handling the potentially corrupted data. For example, the corrupted data may be discarded, thereby preventing forecasts from being degraded by the inclusion of the corrupted data. In some circumstances, weather forecasting may be improved without having certain data rather than using corrupted data. The weather community system(s), or additional components of the DGSS system, might also use the feedback information to deterministically adjust the measurements to take into account the OOB emissions. For example, based on the actual OOB emissions calculated, weather community systems or components of the DGSS system may adjust sensor data to reduce certain measurements. Such adjustments may be performed even if the OOB emissions are less than a threshold (e.g., a lawful emission limit), as measurements may be corrupted even when networks comply with some limits. That is, some limits may be set so high that the OOB emissions may be under them and still corrupt the measurements. Furthermore, the feedback information may allow devices (of the DGSS system, weather community etc.), using machine learning or pattern recognition techniques, to estimate actual environmental data (e.g., actual amounts of water vapor, ice, oxygen, chemical species, etc.) based on both the corrupted measurements and measurements from one or more nearby pixels (particularly, those pixels for which measurements were not (or at least not expected to be) corrupted by OOB emissions according to actual calculations).

Figure 11A:
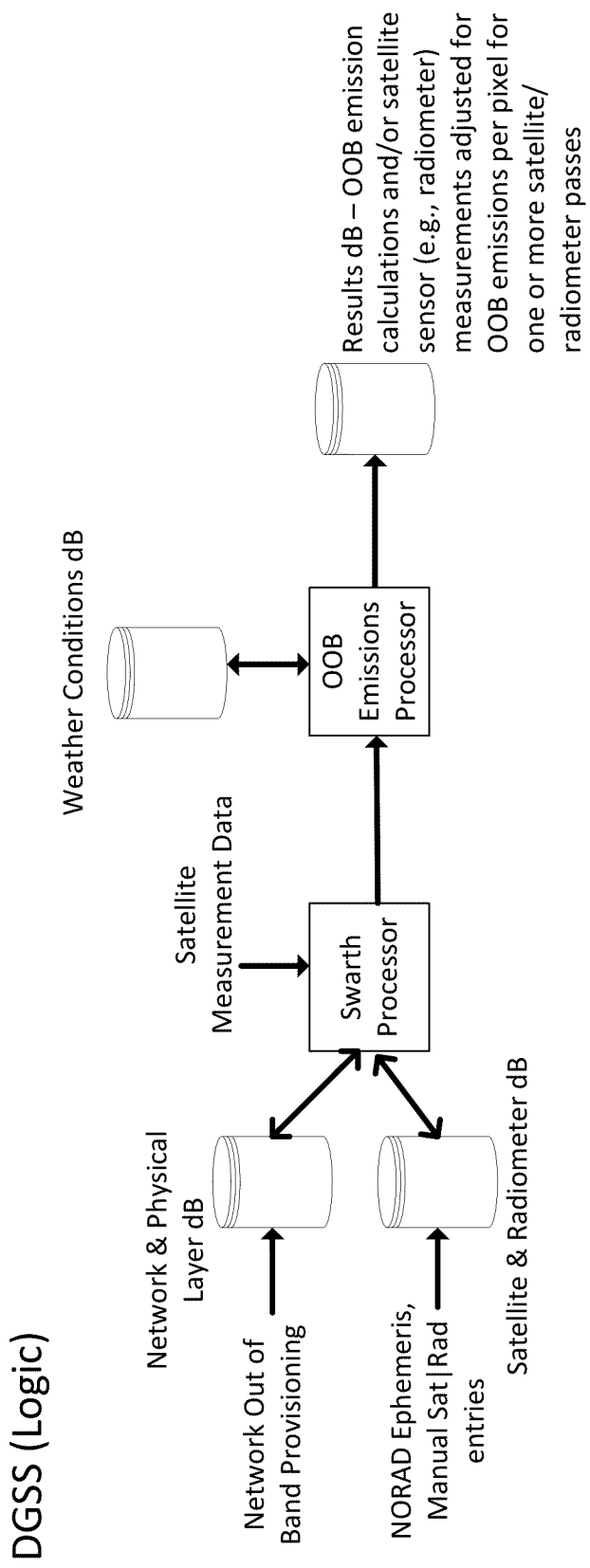
FIGS. 11A and 11B illustrate example system architectures in accordance with aspects of this disclosure.

FIG. 11A illustrates an example DGSS logic architecture configured to calculate the OOB emissions that may be measured in any pixel for any specific satellite or sensor pass. In some embodiments, this DGSS logic architecture may estimate the OOB emissions from one or more base stations (BS) using static BS data (e.g., location, height, azimuth, and polar angles of the base station and/or its antenna(s)). In some examples, no connection (or no real-time communication) between the DGSS logic architecture and the communications network (e.g., 5G, hybrid 4G/5G) may be utilized. For example, the BS location data may be provided from a computing device (e.g., server), of a network provider, that is separate from the communications network (e.g., base stations). In some embodiments, the BS location data may be obtained by an administrator of the DGSS system and may be stored in a database within the DGSS system.

Referring to FIG. 11A, the network and physical layer database may store information about a particular telecommunication network (e.g., 5G network, 4G/5G hybrid network), such as base station information. The base station information may be static information (e.g., information that is expected to stay relatively the same over an extended period of time, such as base station location, antenna information, etc.). The DGSS logic of FIG. 11A also illustrates the satellite and radiometer database for storing information regarding certain satellites and their sensors (e.g., NORAD ephemeris data, World Meteorological Organization instrument and satellite databases, etc.). Using the information from the network and physical layer database and satellite and radiometer database, a swarth processor may determine network nodes (e.g., base stations) in a particular pixel of a particular satellite sensor (e.g., radiometer). The swarth processor may also use measurement data from the satellite sensor to determine the measurements for that pixel. This information may then be passed to the OOB emissions processor to calculate the OOB emissions for that pixel. The OOB emissions processor may use static network information to determine the out of band emissions for that pixel. Moreover, to account for attenuation due to atmospheric gases (e.g., water vapor), the OOB emissions processor may receive weather data for that pixel from a weather condition database. In particular, the OOB emissions processor may receive a pressure, temperature, and water vapor density from the weather condition database. The OOB emissions processor may use this information, in some cases (e.g., depending on frequency band), to adjust the satellite sensor (e.g., radiometer) measurements based on the OOB emissions that may have been received by the satellite sensor (and therefore affected its measurements). As shown in FIG. 11A, the results of the OOB emissions processor's adjustments may be stored in a results database. For example, the results database may store OOB emissions calculations per pixel (or active window) for one or more satellite/radiometer passes/scans and/or satellite sensor (e.g., radiometer) measurements as adjusted for OOB emissions per pixel (or active window) for one or more satellite/radiometer passes/scans. Further, although only one OOB emissions processor is illustrated, it should be understood that one or more OOB emissions processors may be implemented within a DGSS system. For example, there may be one OOB emissions processor for one satellite/radiometer and another OOB emissions processor for another satellite/radiometer. Or, there may be multiple processors or processor threads used with a single satellite/radiometer used to improve calculation speed. Likewise, there may be separate results databases (e.g., one for each satellite/radiometer).

Figure 11B:
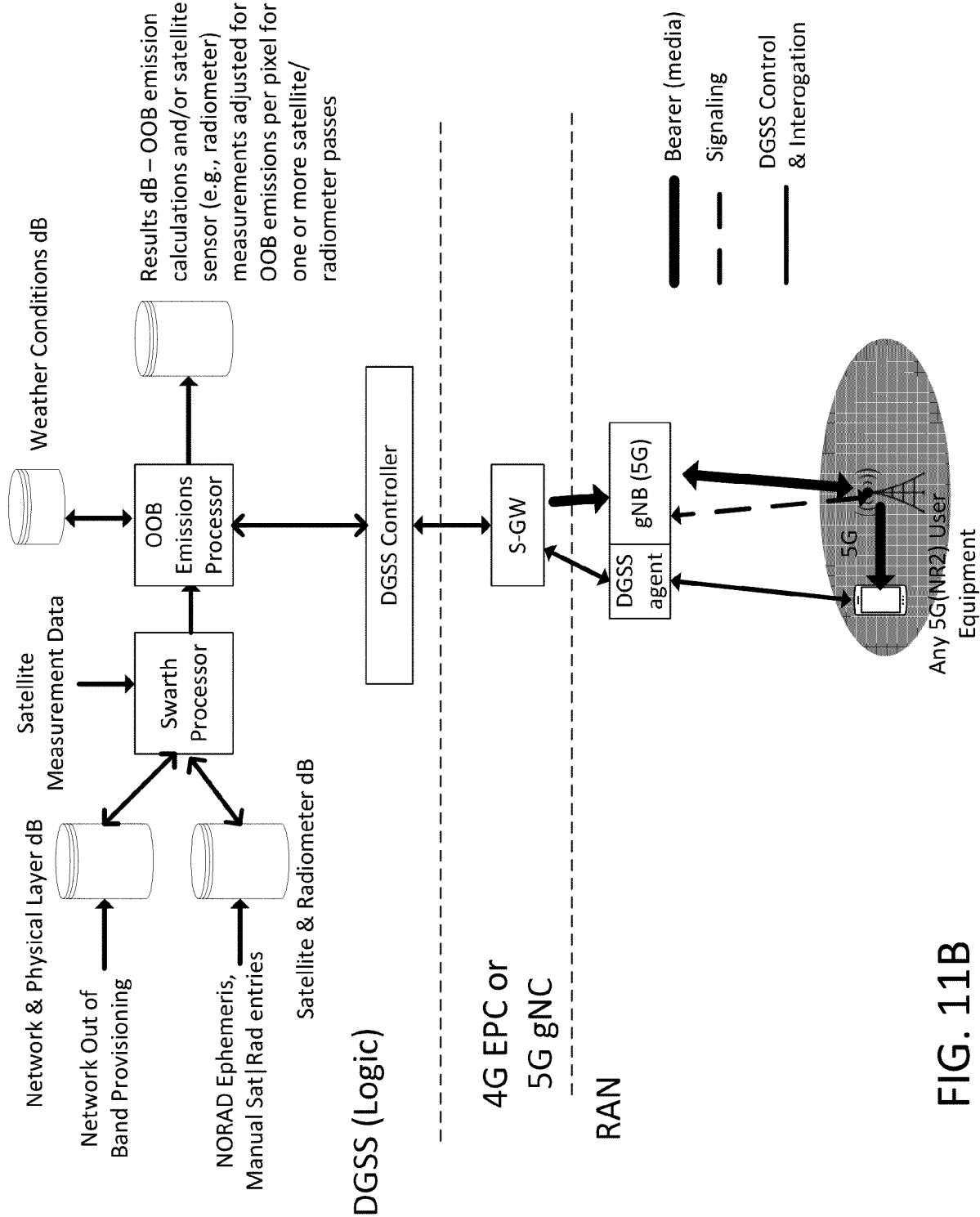

FIG. 11B illustrates another example DGSS logic architecture configured to calculate the OOB emissions that may be measured in any pixel for any specific satellite or sensor pass. In some embodiments, the OOB emissions calculation of this architecture may be more comprehensive than that of the architecture in FIG. 11A. This is because the architecture in FIG. 11B may take into account the real time number and potentially the location of UEs with respect to the BSs. That is, in the FIG. 11B embodiment, the DGSS logic may use dynamic network information such as the number and location of UEs (e.g., mobile stations) connected to a particular base station. Accordingly, as shown in FIG. 11B, the DGSS logic architecture may utilize a network connection to interrogate one or more base stations (e.g., gNBs) for BS data, UE data (e.g., position information of UEs), and/or weather conditions associated with a particular base station. The DGSS logical architecture may also query other logical 5G or 4G/5G network entities (such as the Home Subscription Service, or HSS database) for network information. Additionally, or alternatively, the UEs themselves may be interrogated for this information (e.g., their position information or associated weather information). For example, the DGSS controller may control the serving gateway S-GW to cause it to interrogate the base stations and/or UEs in a particular pixel to ascertain dynamic network information, as shown in FIG. 11B. The DGSS controller may then provide the results of this interrogation to the OOB emissions processor, which may use the results, in addition to current weather information from the weather conditions database, to calculate the OOB emissions for a particular pixel. As explained above, the weather conditions database may provide temperature, pressure, and water vapor density measurements that the OOB emissions processor may use to account for attenuation when calculating the OOB emissions for a particular pixel. In some embodiments, e.g., where sensors are installed at the base stations so that the BS data could include the temperature, pressure, and water vapor density measurements associated with a particular base station, the weather conditions database might not be utilized. In such embodiments, the DGSS logic (e.g., OOB emissions processor) may use the weather condition data provided (e.g., via DGSS agent(s)) from one or more base stations in a pixel (or active window) to determine the attenuation of OOB emissions for that pixel (or active window). Using weather condition information from sensors collocated with base stations may improve the efficiency in calculating the attenuation due to weather conditions of OOB emissions.

FIG. 12 shows a flow chart of an example algorithm that can be used to calculate the OOB emissions based on actual network parameters. Using the algorithm in FIG. 12, actual OOB emissions for a specific pixel may be determined. In some embodiments, the satellite and/or sensor may collect information indicating where the sensor is "looking" (e.g., indicating the sensor's actual IFOV). The satellite, sensor, or another computing device back on Earth may tag the measurement data with data defining the IFOV (or the pixel corresponding to the IFOV). Thus, in some embodiments, the actual pixel location may be received, as opposed to predicted based on sensor and/or satellite parameters, thereby avoiding potential inaccuracies in predicting the pixel location. Using the received pixel as a starting point, DGSS logic may perform the algorithm in FIG. 12 to obtain the actual OOB emissions for that pixel, and subsequently notify interested entities of whether the measurement data for that pixel might be corrupted. The OOB emissions received by the satellite sensor is calculated by using the OOB Total Radiated Power from each antenna (BS and UE), and then calculating the fraction of that power that is incident on the satellite sensor. That fraction is dependent upon BS or UE antenna gain at the sensor (which in turn is a function of the elevation and the azmuth and polar angles with respect to the satellite position), along with all propagation based losses (free space path loss, atmospheric attenuation at the given frequency, etc.).

Also, in embodiments where the DGSS system does not change network parameters (e.g., transmission characteristics or traffic), there is no time constant associated with the network's ability to modify the parameters based on predictions. As a result, there is no timing concern or need to consider a pixel's location to within a given scan line. The net outcome of this is that pixel location accuracy may be the geo-location accuracy of any given pixel, or $\approx \left(\frac{P_d}{2}\right)$.

Another aspect of this disclosure, is to improve the geolocation accuracy of pixels. This may be done by, e.g., flying sensors (e.g., radiometers, sounders, instruments, etc.) with smaller IFOVs and therefore smaller pixels. In some examples, beacons (e.g., small signaling devices or other markers) could be placed on the ground with known locations. Thus, in some examples, the same receiving optics that are used for taking measurements (e.g., the rotating reflector that points radiation into the sensor) may also be used to listen for signals from signal-transmitting beacons. The use of beacons could improve the geolocation accuracy of any pixel by adding a beacon channel, to the sensor (e.g., radiometer) measurements, that tags the location of any given beacon. For example, the sensor and/or satellite may generate a first data stream that indicates a radiance for each pixel and a second data stream, associated with the first data stream (e.g., in synchronization with or otherwise time-related), that indicates when a pixel encompasses a particular beacon (e.g., by providing a Boolean for indicating whether a particular beacon frequency was detected for each pixel, such as a data stream that indicates that a beacon frequency X at pixel 1 = no (or false), at pixel 2 = here (or true), and at pixel 3 = no (or false)). Using beacon tagged pixel locations may significantly improve the reliability and accuracy of pixel locations. Because these beacons could be either low bandwidth (e.g., kb/s) or a single frequency (i.e., no bandwidth), they could be extremely narrowband and low power (e.g., implemented with shot noise limited heterodyne detection), making them practical to deploy.

Figure 13:
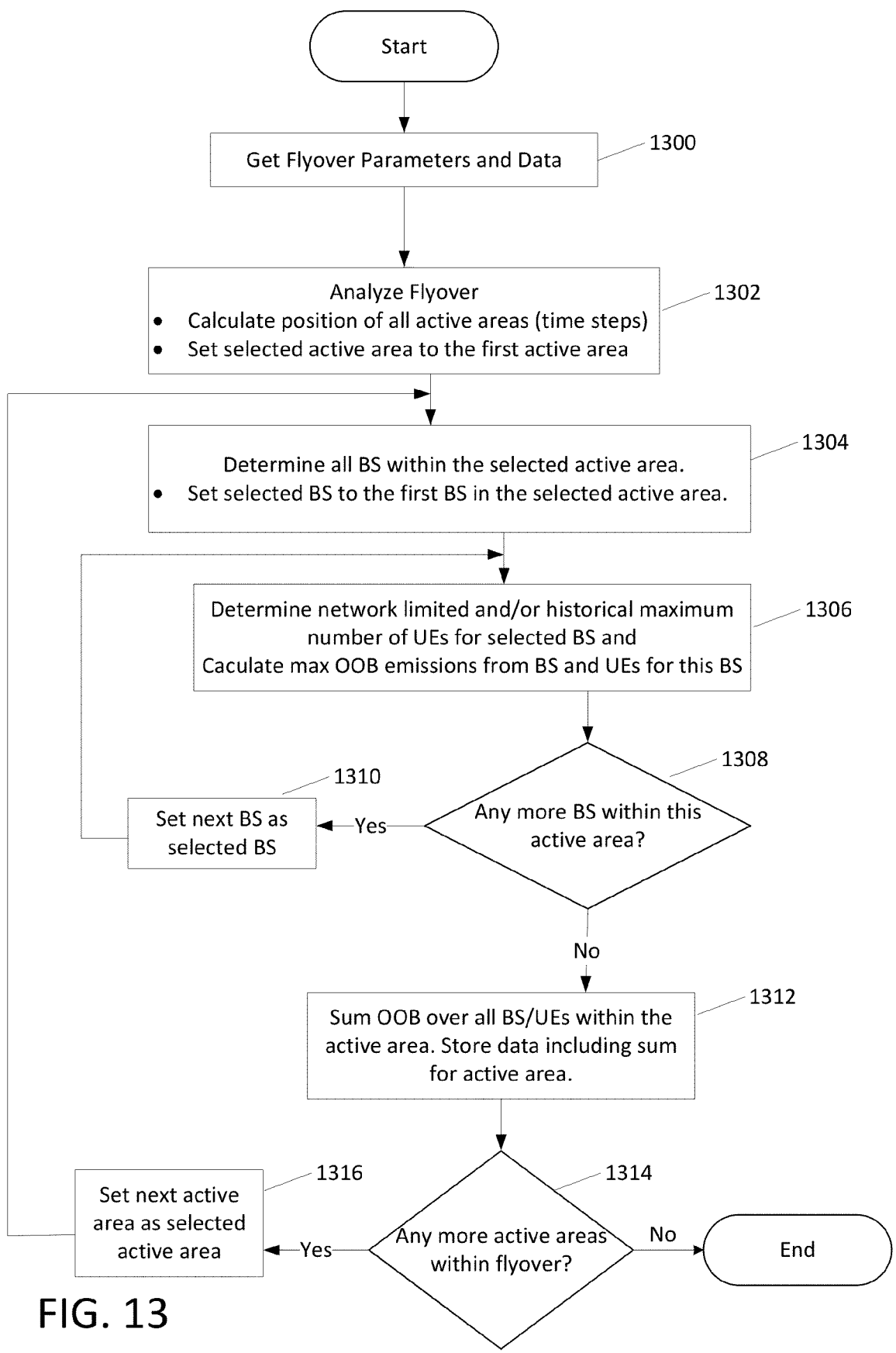
FIG. 13 is a flow chart showing an example process in accordance with aspects of this disclosure.

FIG. 13 shows a flow chart of an example algorithm that can be used to pre-determine geographical regions corresponding to DGSS active windows that may meet OOB emissions limits without network modifications. That is, the algorithm of FIG. 13 provides an example process for pre-calculating, based on satellite and orbital parameters and based on the base station infrastructure, geographical regions that correspond to DGSS active windows and are expected to meet the OOB emissions limits without having to modify communications traffic (e.g., 5G traffic), transmission power, or a number of user equipment connected to base stations within those geographical regions. Prior to the flyover of any given satellite, the DGSS system may pre-calculate DGSS active window areas where the maximum (e.g., worst case) OOB emissions within that active window area will be lower than OOB emissions limit. In some embodiments, this pre-calculation may involve using machine learning techniques based on previous flyovers. Here a flyover refers to an entire path taken by a satellite to complete one scan.

By pre-determining the active areas that do not require modifications (of 5G traffic, transmission power, or number of connected user equipment), the computing resources and network impact of the DGSS system can be reduced. Further, this pre-determination may allow the DGSS system to focus on those active areas that do not comply with OOB emissions limits (e.g., those active areas with the highest contributions to OOB emissions). The algorithm for this calculation may depend on the orbital parameters of the satellite, the sensor's (e.g., radiometer's) parameters, the number and type of base stations, and the number of connected UEs. For example, there may be pixels in rural or semi-rural areas in which the density of base stations (e.g., low base station density areas) precludes the possibility of OOB interference. A low number of base stations will put a limit on the maximum number of connected UEs in an area. Similarly, there may be pixels in urban areas where there is almost always going to be OOB interference based on the number of base stations and a historical average of the number of UEs.

FIG. 13 illustrates one example algorithm for making this pre-determination, but other algorithms will also be understood from this example. The algorithm may be performed by one or more of the components of the DGSS system, such as the swarth processor and/or OBB emissions processor. FIG. 13 begins with a step 1300 of getting flyover parameters and associated data. This may include retrieving satellite orbital parameters, sensor (e.g., radiometer) parameters, and/or network infrastructure data (e.g., base station location information, historical network usage data, etc.). Next, a step 1302 of analyzing the flyover is initiated. This includes calculating the position of all active window areas (time steps) of the flyover for a particular satellite sensor. The active window calculations discussed above may be executed here. As discussed above, given the satellite flight path and sensor orientation and scan pattern, the DGSS system may determine an active window for a particular satellite sensor at any given time. Step 1302 may also include setting a selected active window area to a first one of the plurality of active window areas calculated.

In step 1304, the DGSS system may determine all base stations within the selected active window area. Step 1304 may also include setting a selected base station to the first base station in a list of base stations in the selected active window area. At step 1306, a maximum number of UEs for the selected base station is determined based on historical data indicating the maximum number of attached UEs and/or based on a network limit for a number of attached UEs (which may vary by base station or network provider). In some embodiments, the DGSS system (e.g., the OOB emissions processor and/or DGSS controller as shown in FIG. 11B) may analyze (or scan) a telecommunications network to ascertain the maximum number of UEs. For example, the OOB emissions processor may instruct the DGSS controller to: (i) poll base stations (all or particular ones in a pixel or active window) to provide their respective limit on number of attached UEs; or (ii) query a DGSS agent or Network & Physical layer database (see FIG. 11B) to provide historical data indicating a maximum number of UEs attached to base stations (all or particular ones). This analysis (or scan) may be performed in real-time (e.g., when an OOB emissions processor is calculating OOB emissions for a pixel or active window), periodically (e.g., monthly), or in response to certain events (e.g., addition of one or more base stations to the network). Step 1306 may also include calculating maximum OOB emissions from the selected base station and UEs based on the maximum number of UEs determined from the network limit and/or historical data.

In step 1308, the DGSS system determines whether there are any more base stations, within the selected active window area, to be evaluated. If so (Yes at step 1308), the selected base station is set to a next base station to be evaluated in step 1310 and the process returns to step 1306. If not (No at step 1308), the DGSS system performs step 1312.

In step 1312, the DGSS system sums the OOB emissions over all base stations and user equipment within the selected active window area and stores the sum. After step 1312, the DGSS system determines whether there are any more active window areas, within the flyover, to be evaluated at step 1314. If so (Yes at step 1314), the selected active window is set to a next active window to be evaluated in step 1316 and the process returns to step 1304. If not (No at step 1314), the process may end. At that end, all active windows of the flyover have been evaluated and maximum OOB emissions have been determined and stored for each. This stored information may then be compared with one or more OOB emission limits to pre-determine which active windows will not need network modifications and which active windows might need network modifications to protect satellite sensor data (e.g., radiometer measurements of atmospheric water vapor).

Figure 14:
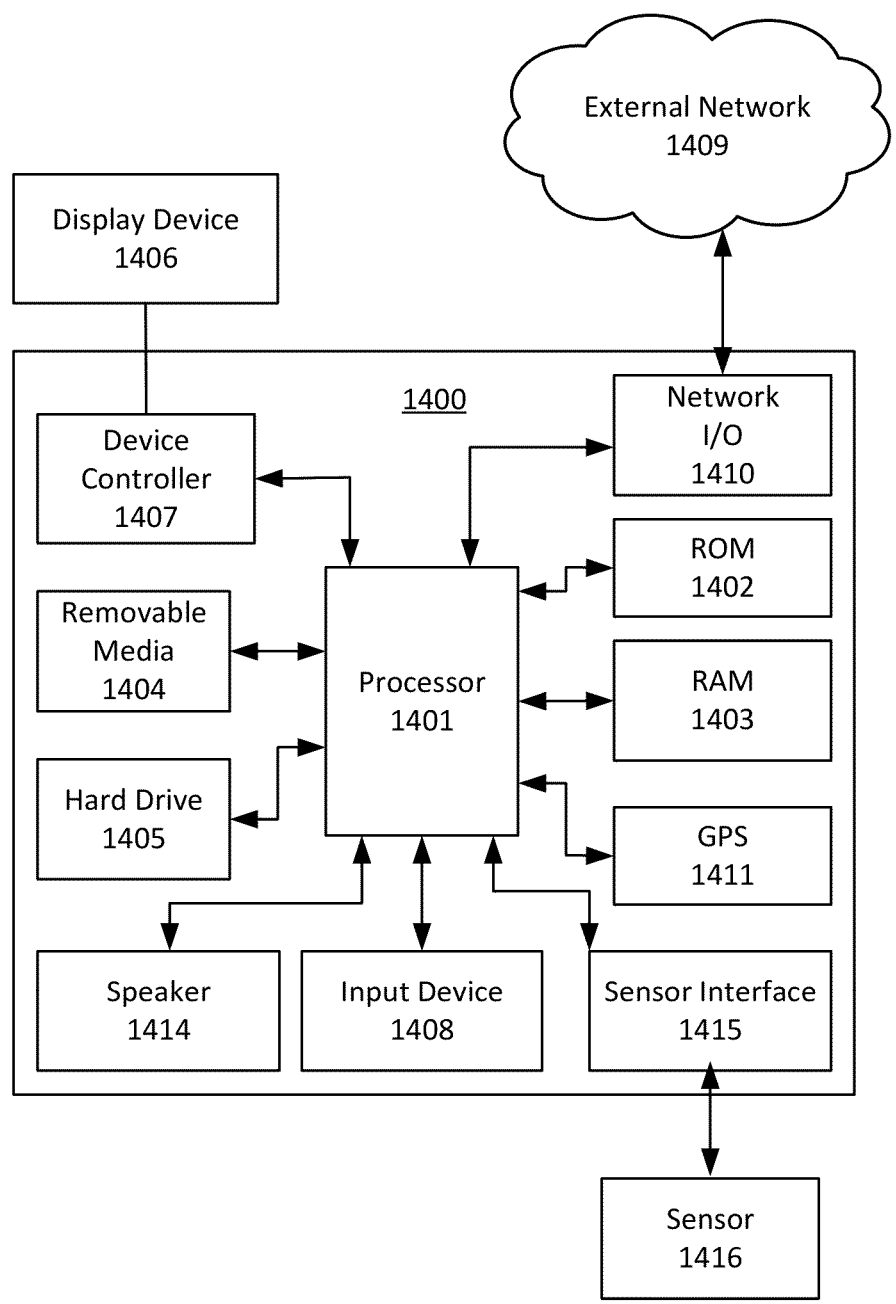
FIG. 14 shows example hardware elements of an example computing device.

FIG. 14 shows hardware elements of a computing device 1400 that may be used to implement any of the computing devices described herein (e.g., computing devices of DGSS logic 101, 901). The computing device 1400 may comprise one or more processors 1401, which may execute instructions of a computer program to perform any of the functions described herein. Any of the processors (e.g., swarth processor, OOB emissions processor, and NTP) specifically mentioned herein may be implemented with a general processor, like processor 1401, executing specific instructions for performing specific functions (e.g., OOB emissions calculations) according to the algorithms described herein. The instructions may be stored in a read-only memory (ROM) 1402, random access memory (RAM) 1403, removable media 1404 (e.g., a USB drive, a compact disk (CD), a digital versatile disk (DVD)), and/or in any other type of computer-readable medium or memory. Instructions may also be stored in an attached (or internal) hard drive 1405 or other types of storage media. The computing device 1400 may comprise one or more output devices, such as a display device 1406 (e.g., an external monitor and/or other external or internal display device) and a speaker 1414, and may comprise one or more output device controllers 1407, such as a video processor (e.g., for providing DGSS simulations). One or more user input devices 1408 may comprise a remote control, a keyboard, a mouse, a touch screen (which may be integrated with the display device 1406), microphone, etc. The computing device 1400 may also comprise one or more network interfaces, such as a network input/output (I/O) 1410 (e.g., a network card) to communicate with an external network 1409 (e.g., the Internet, or a LAN for the DGSS servers 102 or DGSS logic 101). Through the network I/O the computing device 1400 may receive various information (e.g., NORAD's ephemeris). The network I/O interface 1410 may be a wired interface (e.g., electrical, RF (via coax), optical (via fiber)), a wireless interface, or a combination of the two. The network I/O interface 1410 may comprise a modem configured to communicate via the external network 1409. The external network 1409 may comprise the communication links discussed above, a network provider's wireless, coaxial, fiber, or hybrid fiber/coaxial distribution system, or any other desired network. The computing device 1400 may also comprise a location-detecting device, such as a global positioning system (GPS) microprocessor 1411, which may be configured to receive and process global positioning signals and determine a geographic position of the computing device 1400.

The computing device 1400 may also include a sensor interface 1415 for interfacing with a particular sensor 1416. For example, the computing device 1400 may interface with the ATMS to receive sensor orientation information or measurements (e.g., water vapor measurements).

Although FIG. 14 shows an example hardware configuration, one or more of the elements of the computing device 1400 may be implemented as software or a combination of hardware and software. Modifications may be made to add, remove, combine, divide, etc. components of the computing device 1400. Additionally, the elements shown in FIG. 14 may be implemented using basic computing devices and components that have been configured to perform operations such as are described herein. For example, a memory of the computing device 1400 may store computer-executable instructions that, when executed by the processor 1401 and/or one or more other processors of the computing device 1400, cause the computing device 1400 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic.

The computing device 1400 may, for example, be used to run a simulation for a DGSS system 100. From the simulation, telecommunication providers may be able to determine the worst-case network availability. Moreover, results of the simulation may be used to optimize the communications network (e.g., 5G network). For example, results of the simulation may indicate that power from base stations 150 and/or user equipment 160 in a particular area would not exceed the noise floor of a sensor (e.g., a radiometer like ATMS). Thus, the results of the simulation might be used by a communications network provider to build out its network (e.g., 5G network). For example, the simulation results may reveal that 5G transmissions in a particular area would not interfere with sensor measurements (e.g., radiometer measurements of atmospheric water vapor and ice), and such results may be used by a 5G network provider to build out its 5G network in that particular area. The 5G network provider could continue to run the simulation and build out its network until the simulation indicates that the network has reached a point where power from its transmissions would interfere with satellite sensor data. Furthermore, based on a DGSS system 100 simulation indicating that transmissions in a particular area would not interfere with satellite sensor data, a 5G network provider may discover that it does not need to modify transmission characteristics or traffic for that particular area even if it falls within the active window.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A system, comprising:
   a first database configured to store orbital parameter data and sensor parameter data, wherein the orbital parameter data indicates a position of a satellite that comprises a sensor configured to measure electromagnetic radiation associated with a first frequency band and the sensor parameter data indicates at least an orientation of the sensor;
   a second database configured to store base station location information indicating locations of a plurality of base stations configured to wirelessly communicate with user equipment; and
   one or more computing devices configured to:
      receive the orbital parameter data and the sensor parameter data;
      determine, based on the orbital parameter data and the sensor parameter data, a pixel representing an instantaneous field of view of the sensor;
      determine, based on the pixel, a window, wherein the window is an area comprising the pixel;
      receive the base station location information;
      determine, based on the base station location information, a base station located within the window;
      determine a first time and a second time between which the base station is located within the window; and
      output the first time and the second time in association with data identifying the base station.

2. The system of claim 1, wherein the first time comprises a start time at which the base station enters the window and the second time comprises a stop time at which the base station exits the window.

3. The system of claim 1,
   wherein the base station is configured to transmit signals associated with a second frequency band, and
   wherein the first frequency band comprises 24.25-27.50 GHz and the second frequency band comprises 23.60-24.00 GHz.

4. The system of claim 1, wherein the base station location information comprises a latitude and a longitude of the base station.

5. A method, comprising:
   receiving, by one or more computing devices, orbital parameter data indicating at least a position of a satellite and sensor parameter data of a sensor that is on the satellite and configured to measure electromagnetic radiation associated with a first frequency band;
   determining, based on the orbital parameter data and the sensor parameter data, a pixel representing an instantaneous field of view of the sensor;
   determining, based on the pixel, a window, wherein the window is an area comprising the pixel;
   receiving base station location information indicating locations of a plurality of base stations configured to wirelessly communicate with user equipment;
   determining, based on the base station location information, a base station located within the window;
   determining a first time and a second time between which the base station is located within the window; and
   outputting the first time and the second time in association with data identifying the base station.

6. The method of claim 5,
   wherein the base station is configured to transmit signals associated with a second frequency band, and
   wherein the first frequency band comprises 24.25-27.50 GHz and the second frequency band comprises 23.60-24.00 GHz.

7. The method of claim 5,
   wherein the receiving the sensor parameter data comprises receiving, from the satellite, a beacon signal indicating a predetermined orientation of the sensor, and
   wherein the determining the pixel is based on the beacon signal.

8. The method of claim 5, wherein the first time comprises a start time at which the base station enters the window and the second time comprises a stop time at which the base station exits the window.

9. The method of claim 5, further comprising:
   determining, based on the base station location information, a second base station located within the window;
   determining a third time and a fourth time between which the base station is located within the window; and
   outputting the third time and the fourth time in association with second data identifying the second base station.

10. The method of claim 5, wherein the outputting comprises outputting an emission limit for the base station.

11. The method of claim 10, wherein the emission limit is based on weather information.

12. The method of claim 5, further comprising:
    controlling the base station to reduce transmission power between the first time and the second time.

13. A system, comprising:
    one or more computing devices, comprising one or more processors, and configured to:
       receive orbital parameter data indicating at least a position of a satellite and sensor parameter data of a sensor that is on the satellite and configured to measure electromagnetic radiation associated with a first frequency band;

determine, based on the orbital parameter data and the sensor parameter data, a pixel representing an instantaneous field of view of the sensor;

determine, based on the pixel, a window, wherein the window is an area comprising the pixel;

receive base station location information indicating locations of a plurality of base stations configured to wirelessly communicate with user equipment;

determine, based on the base station location information, a base station located within the window; and determine a first time and a second time between which the base station is located within the window; and output the first time and the second time in association with data identifying the base station.

14. The system of claim 13, wherein the first time comprises a start time at which the base station enters the window and the second time comprises a stop time at which the base station exits the window.

15. The system of claim 13, wherein the base station is configured to transmit signals associated with a second frequency band, and wherein the first frequency band comprises 24.25-27.50 GHz and the second frequency band comprises 23.60-24.00 GHz.

16. The system of claim 13, wherein the base station location information comprises a latitude and a longitude of the base station.

17. The system of claim 13, wherein the one or more computing devices are configured to:

determine, based on the base station location information, a second base station located within the window;

determine a third time and a fourth time between which the base station is located within the window; and output the third time and the fourth time in association with second data identifying the second base station.

18. The system of claim 13, wherein the one or more computing devices are configured to:

output an emission limit for the base station.

19. The system of claim 18, wherein the emission limit is based on weather information.

20. The system of claim 13, wherein the one or more computing devices are configured to control the base station to reduce transmission power between the first time and the second time.

* * * * *